United States Patent [19]

Tajima

[11] Patent Number: 6,057,808
[45] Date of Patent: *May 2, 2000

[54] FM MULTIPLEX BROADCAST RECEIVING APPARATUS COMPRISING DETACHABLE STORING MEDIUM

[75] Inventor: Yoichiro Tajima, Kunitachi, Japan

[73] Assignee: Casio Computer Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,357

[22] Filed: Mar. 12, 1996

[30] Foreign Application Priority Data

Mar. 16, 1995 [JP] Japan ................................. 7-084698
Mar. 16, 1995 [JP] Japan ................................. 7-084699
Mar. 16, 1995 [JP] Japan ................................. 7-084702

[51] Int. Cl.⁷ ................................................ G09G 5/00
[52] U.S. Cl. ................................................ 345/2
[58] Field of Search .................... 345/2; 340/825.27, 340/825.29, 825.3, 825.36, 825.37, 825.44, 825.34; 379/357; 455/186.1, 418, 407, 410, 558

[56] References Cited

U.S. PATENT DOCUMENTS

| | | | |
|---|---|---|---|
| 5,045,848 | 9/1991 | Fascenda | 340/825.26 |
| 5,049,874 | 9/1991 | Ishida et al. | 340/825.44 |
| 5,144,663 | 9/1992 | Kudelski et al. | 380/16 |
| 5,325,429 | 6/1994 | Kurgan | 379/429 |
| 5,371,493 | 12/1994 | Sharpe | 340/825.34 |
| 5,398,021 | 3/1995 | Moore | 340/825.27 |
| 5,504,475 | 4/1996 | Houdou et al. | 340/825.35 |
| 5,604,787 | 2/1997 | Kotzin et al. | 379/357 X |
| 5,655,003 | 8/1997 | Erving | 455/418 |

FOREIGN PATENT DOCUMENTS

| | | |
|---|---|---|
| 0314871 A1 | 5/1989 | European Pat. Off. . |
| 0518797 A1 | 12/1992 | European Pat. Off. . |
| 4-134930 | 5/1992 | Japan . |
| WO 93/07715 | 4/1993 | WIPO . |

OTHER PUBLICATIONS

Systems and Computers in Japan, May, 1988, USA, vol. 19, No.5, Tashiro et al, Implementation of a Small–Scale Prototype for Software Service System.

Patent Abstracts of Japan, vol. 94 No. 011 & JP–A–06 311060 Alpine Electron Inc, Nov. 4, 1994.

Primary Examiner—Jeffery Brier
Attorney, Agent, or Firm—Frishauf, Holtz, Goodman, Langer & Chick, P.C.

[57] ABSTRACT

A service information receiving apparatus for receiving pay service information and date data which is multiplexed on FM broadcast waves transmitted from an FM broadcasting station, wherein use end day data calculated on the basis of valid term relative value data stored in a detachable IC card installed in the service information receiving apparatus and the received date data is acquired and stored, and the stored use end date data and received date data are compared. The display of pay service information is permitted while both data do not coincide, and the display of pay service information is prohibited after both data have coincided.

16 Claims, 21 Drawing Sheets

FIG.22

| PROGRAM SCHEDULE | | |
|---|---|---|
| PROGRAM NAME | PAY | SAMPLE PROGRAM |
| 1. PROGRAM a | | |
| 2. PROGRAM b | ○ | |
| 3. PROGRAM c | ○ | ○ |
| 4. PROGRAM d | ○ | ○ |

FIG.23

| PROGRAM SCHEDULE | | |
|---|---|---|
| PROGRAM NAME | PAY | SAMPLE PROGRAM |
| 1. PROGRAM a | | |
| 2. PROGRAM b | ○ | |
| 3. PROGRAM c | ○ | ○ |
| 4. PROGRAM d | ○ | ○ |

FIG.24

PAY PROGRAM RECEPTION SETUP — NO. OF PROGRAMS THAT CAN BE SET 0

| PROGRAM NAME | SETUP |
|---|---|
| 1. PROGRAM a | |
| 2. PROGRAM b | ○ |
| 3. PROGRAM c | |
| 4. PROGRAM d | ○ |

FM MULTIPLEX BROADCAST RECEIVING APPARATUS COMPRISING DETACHABLE STORING MEDIUM

BACKGROUND OF THE INVENTION

1. Field of the Invention

The present invention relates to a receiving apparatus for receiving and displaying pay display information transmitted from a broadcasting station or the like. More particularly, the present invention is preferably applied to a receiver for FM multiplex broadcast information multiplexed on FM radio broadcast waves, but is not limited thereto.

2. Description of the Related Art

Services have recently been provided through the medium of FM (frequency modulation) broadcast waves for displaying service information in a display provided at a receiver, by multiplexing and transmitting service information such as character information on FM broadcast waves carrying audio information. This service is called an FM character multiplex broadcast and it is being put in wide use as visual information radio.

More specifically, an FM broadcasting station at the transmission side transmits radio waves multiplexing characters, numerals and other display information on ordinary FM broadcast waves, and the multiplexed waves are received by an FM radio receiver with a liquid crystal display (LCD) at the reception side, and FM broadcast waves and display information such as characters and numerals are demultiplexed, and the display information is converted into character codes and displayed on the liquid crystal display, so as to be visually presented to a user. As a result, the user can visually recognize, for example, the weather forecast and traffic information by characters. In this FM character multiplex broadcasting, aside from presentation of free information service, pay service is considered for specific information.

When presenting pay service information to the user in such FM character multiplex broadcasting, the company serving the FM character multiplex broadcasting must somehow collect a fee from the user. If, however, collection was made by means of a monthly payment contract between the company and the user, some delay in payment would be likely to occur, and management of the listeners would be complicated.

From the standpoint of the user, on the other hand, if it were required to pay the fee to the company or through the bank or the like, the burden on the user would be heavy. Moreover, in the case of FM character multiplex broadcasting, since the FM broadcast waves are utilized to provide a pay service information, it would be practically impossible to stop presentation of service information only to delinquent listeners.

SUMMARY OF THE INVENTION

It is hence an object of the present invention to present a display information receiving apparatus and storing medium which makes it easy for the user to pay the fee and which is capable of managing the listeners without trouble for the company in the case of transmission of pay display information.

To achieve this object, according to one aspect of the present invention, a display information receiving apparatus comprises receiving means for receiving display information transmitted from a display information transmitting station, display means for displaying the display information received by the receiving means, an apparatus main body detachably having a storing medium for storing time information for indicating the time, memory means for storing the time information read out from the storing medium attached to the apparatus main body, acquiring means for acquiring the present time, judging means for judging if the present time acquired by the acquiring means has reached the time indicated by the time information stored in the memory means, and control means for prohibiting display of the display information transmitted from the display information transmitting station after the judging means has judged the reaching, whereby, when selling a detachable storing medium for the display information receiving apparatus, the fee corresponding to the viewing period of the pay display information by the display information receiving apparatus can be charged, and the pay display information can be viewed even if the storing medium is not attached to the display information receiving apparatus.

Additional objects and advantages of the present invention will be set forth in the description which follows, and in part will be obvious from the description, or may be learned by practice of the present invention.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 22 is a diagram showing a display example of program selection screen;

FIG. 23 is a diagram showing another display example of program selection screen; and FIG. 24 is a diagram showing a display example in pay program reception setup.

DETAILED DESCRIPTION OF THE PREFERRED EMBODIMENTS

A preferred embodiment of an FM multiplex broadcast receiving apparatus according to the present invention will now be described with reference to the accompanying drawings.

Figure 1:
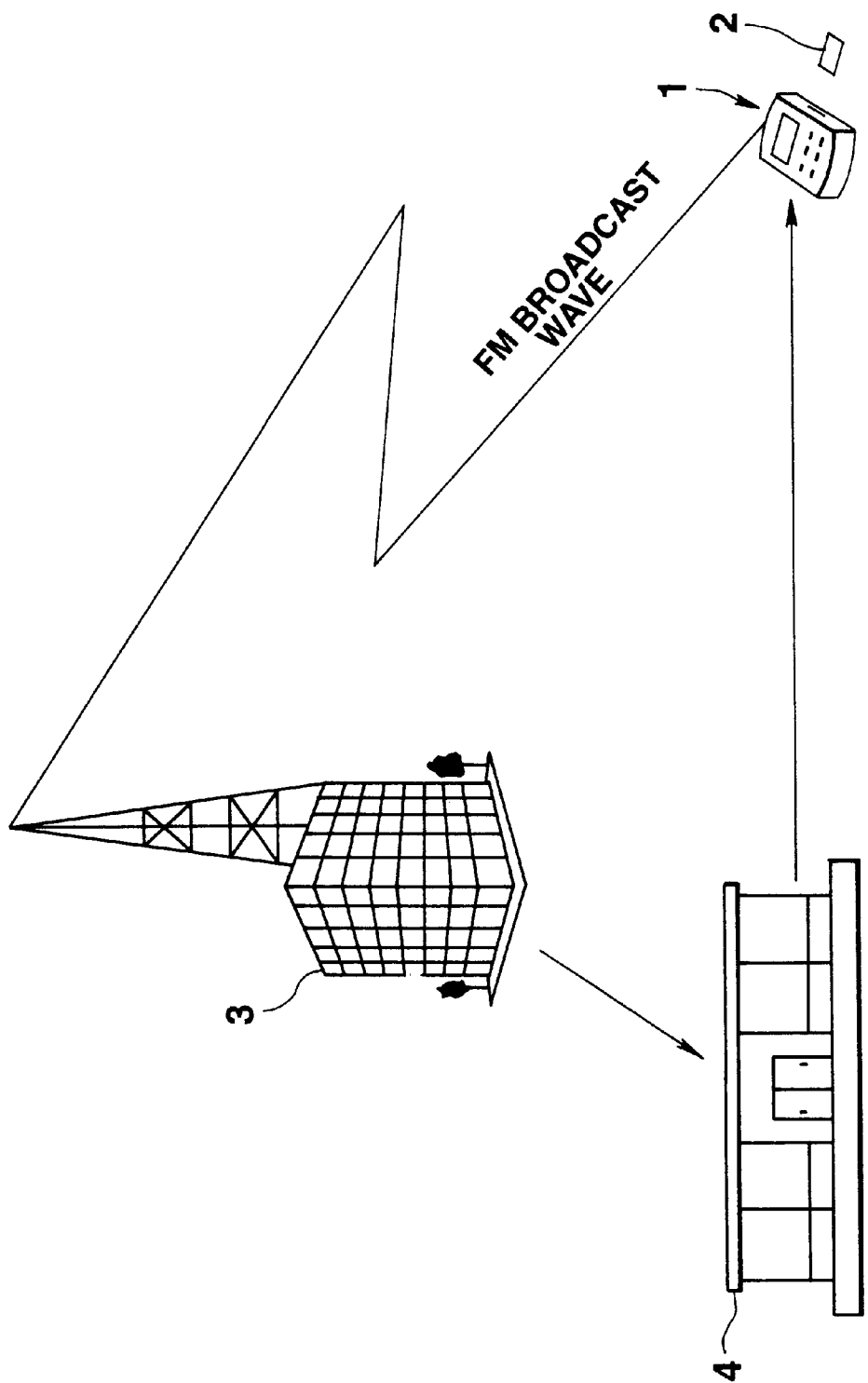
FIG. 1 is a schematic explanatory diagram showing a system configuration of FM character multiplex broadcasting according to an embodiment of the present invention.

FIG. 1 shows a system configuration of FM character multiplex broadcasting system according to an embodiment of the present invention.

This FM character multiplex broadcasting system comprises an FM broadcasting station 3 as a transmitting source of a company for transmitting FM broadcast waves multiplexing pay service information and free service information, a service information receiving apparatus 1 of the embodiment for receiving the FM broadcast waves transmitted from the FM broadcasting station 3, and a retailer 4 such as convenience store for selling an IC (integrated circuit) card 2 which is an information memory means used for receiving pay service information in this service information receiving apparatus 1, in which the retailer 4 contracts a specific card sales contract with the FM broadcasting station 3.

This service information receiving apparatus 1 is described below while referring to FIG. 2 to FIG. 5.

Figure 2:
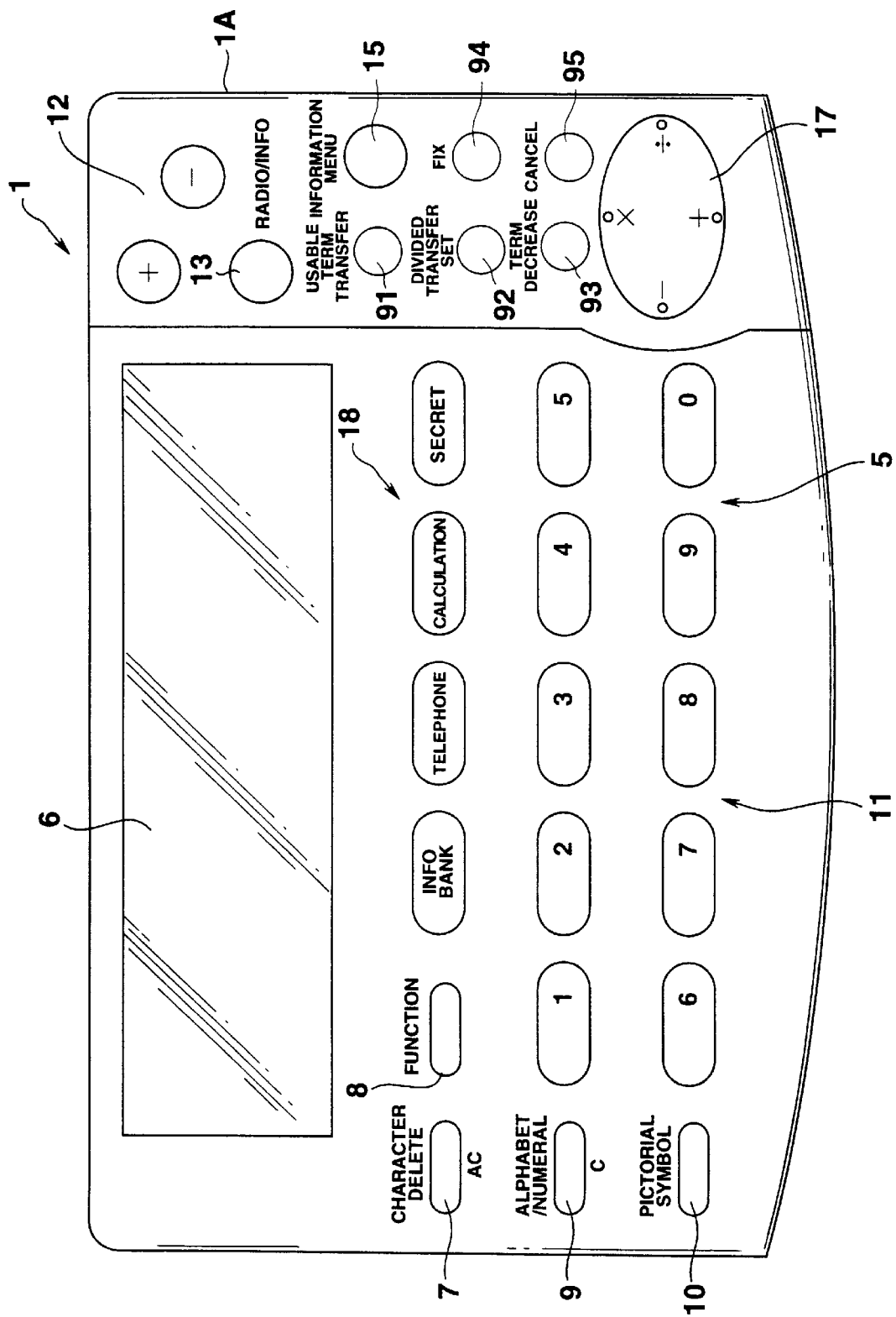
FIG. 2 is a plan view of a service information receiving apparatus of the embodiment.

The service information receiving apparatus 1 comprises, as shown in FIG. 2, a key input unit 5 and a display unit 6 for displaying not only service information but also operation instruction information, provided on the surface of the apparatus main body 1A in a nearly rectangular parallelepiped. The key input unit 5 comprises a character delete key 7, a function select key 8, an alpha/numeric select key 9 for selecting one of alphabet and numerals, a pictograph key 10, an alphanumeric key group 11 for entering alphabet from "A" to "Z" and numerals from "1" to "0", a turning key 12 for tuning reception of broadcast waves, a radio/service information select key 13, an information menu key 15, a usable term transfer (assign) switch 91, a divided transfer setting switch 92, a term decreasing switch 93, a fix (enter) switch 94, a cancel switch 95, and a cursor key 17 for performing FM multiplex program selection, cursor move, run, calculate, and others, and a mode key group 18 for selecting modes of information bank, telephone, calculation, and secret, among others.

Figure 3:
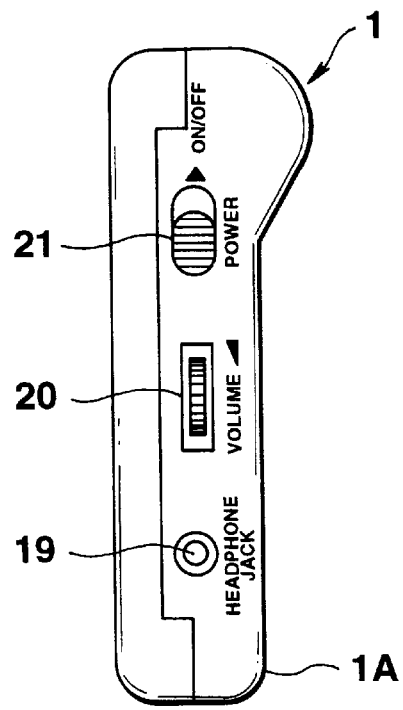
FIG. 3 is a left side view of the service information receiving apparatus.
Figure 4:
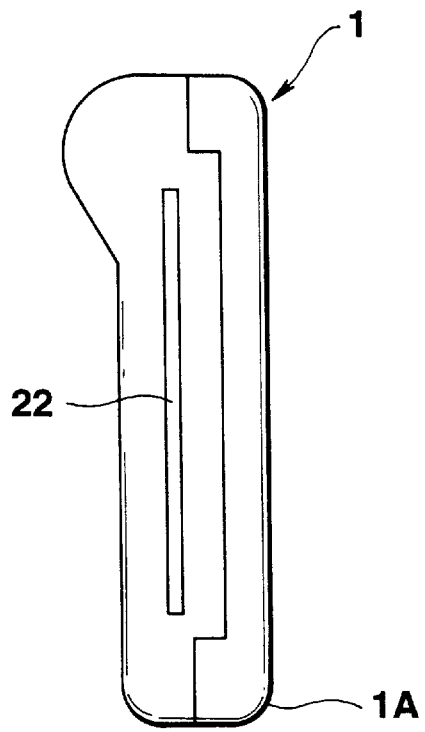
FIG. 4 is a right side view of the service information receiving apparatus.

On one side of the service information receiving apparatus 1, as shown in FIG. 3, a jack 19 for stereo headphones, a volume control dial 20, and a power switch 21 are provided. On the other side of the service information receiving apparatus 1, as shown in FIG. 4, a slot 22 for inserting an IC card 2 which is the information storing medium is provided.

Figure 5:
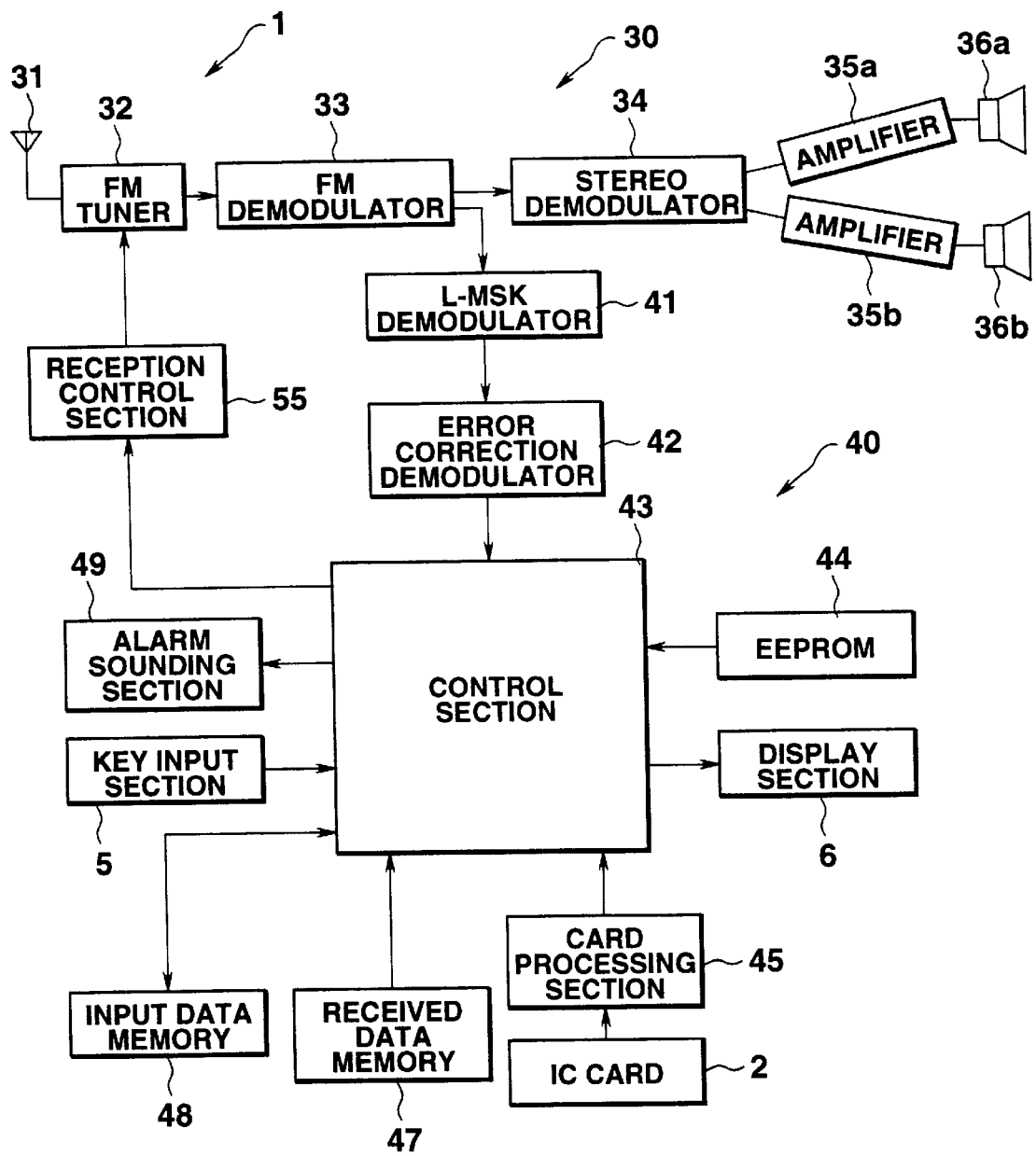
FIG. 5 is a block diagram showing a constitution of the service information receiving apparatus.

FIG. 5 is a block diagram showing a constitution of the service information receiving apparatus 1, which comprises an FM broadcast receiving block 30 for receiving the FM broadcast waves and generating a corresponding sound, and a service information receiving block 40 for presenting various procedures to reception of pay service information and free service information multiplexed on FM broadcast waves received by the FM broadcast receiving block 30.

The FM broadcast receiving block 30 comprises an antenna 31 for receiving FM broadcast waves, an FM tuner 32 for tuning reception of FM broadcast waves, an FM demodulator 33 for demodulating FM signals, a stereo demodulator 34 for demodulating the demodulated FM signals into stereo signals, a pair of amplifiers 35a, 35b for amplifying the output signal of the stereo demodulator 34, and a pair of speakers 36a, 36b for producing the signals amplified by the amplifiers 35a, 35b as sound. Of course, it is also possible to hear FM stereo broadcast by plugging stereo headphones into the stereo headphone jack 19.

The service information receiving block 40 comprises an L-MSK (level controlled minimum shift keying) demodulator 41 connected to the FM demodulator 33 for separating the service information multiplexed on FM broadcast waves by performing digital modulation for changing the magnitude (level) of multiplex signal from 4 to 10% depending on the degree of modulation of L and R signals of the FM stereo broadcast, an error correction decoder 42, and a controller 43 for performing various procedures to the separated service information.

The controller 43 incorporates a ROM (read-only memory) storing a program, and operates according to this program, and also possesses various registers as described below. This controller 43 is connected with an EEPROM (electrically erasable and programmable ROM) 44, the key input section 5, the display section 6, a card processing unit 45 for processing reading and writing of the IC card 2, a reception data memory 47 for storing received data (received information), an input data memory 48 for storing input data (input information) from the key input unit 5, an alarm sounding section 49 for issuing buzzer or alarm depending on the processing result of the controller 43, and a reception control section 55 for reception tuning of the FM tuner 32 depending on the operation of the tuning key 12 in the key input unit 5.

Figure 6:
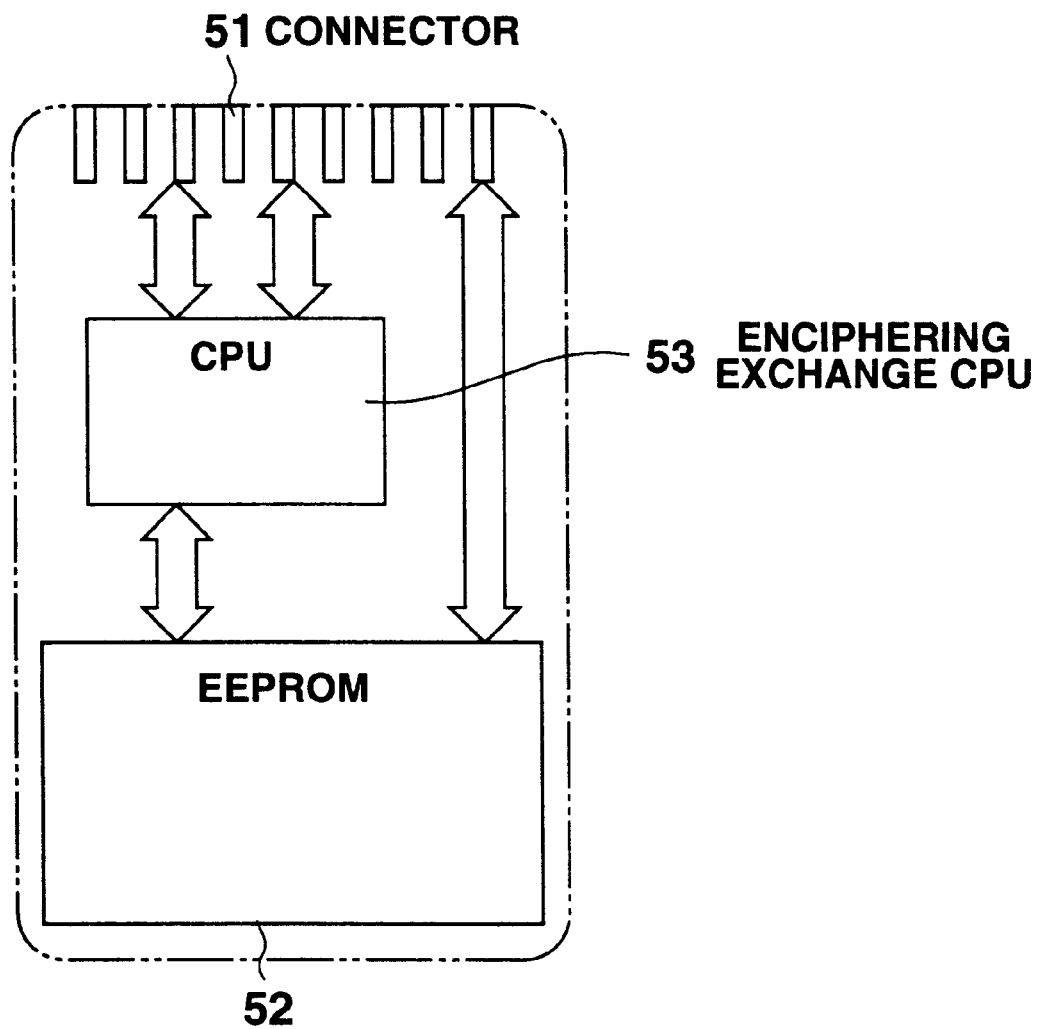
FIG. 6 is a block diagram showing a constitution of an IC card used in the service information receiving apparatus of the embodiment.

FIG. 6 is a block diagram showing the constitution of the IC card 2. This IC card 2 comprises a connector 51 for exchanging data with the main body of the service information reception apparatus 1, an EEPROM 52 for storing the valid term relative data described later and others, and a CPU (central processing unit) 53 for ciphering and exchanging information.

Figure 7:
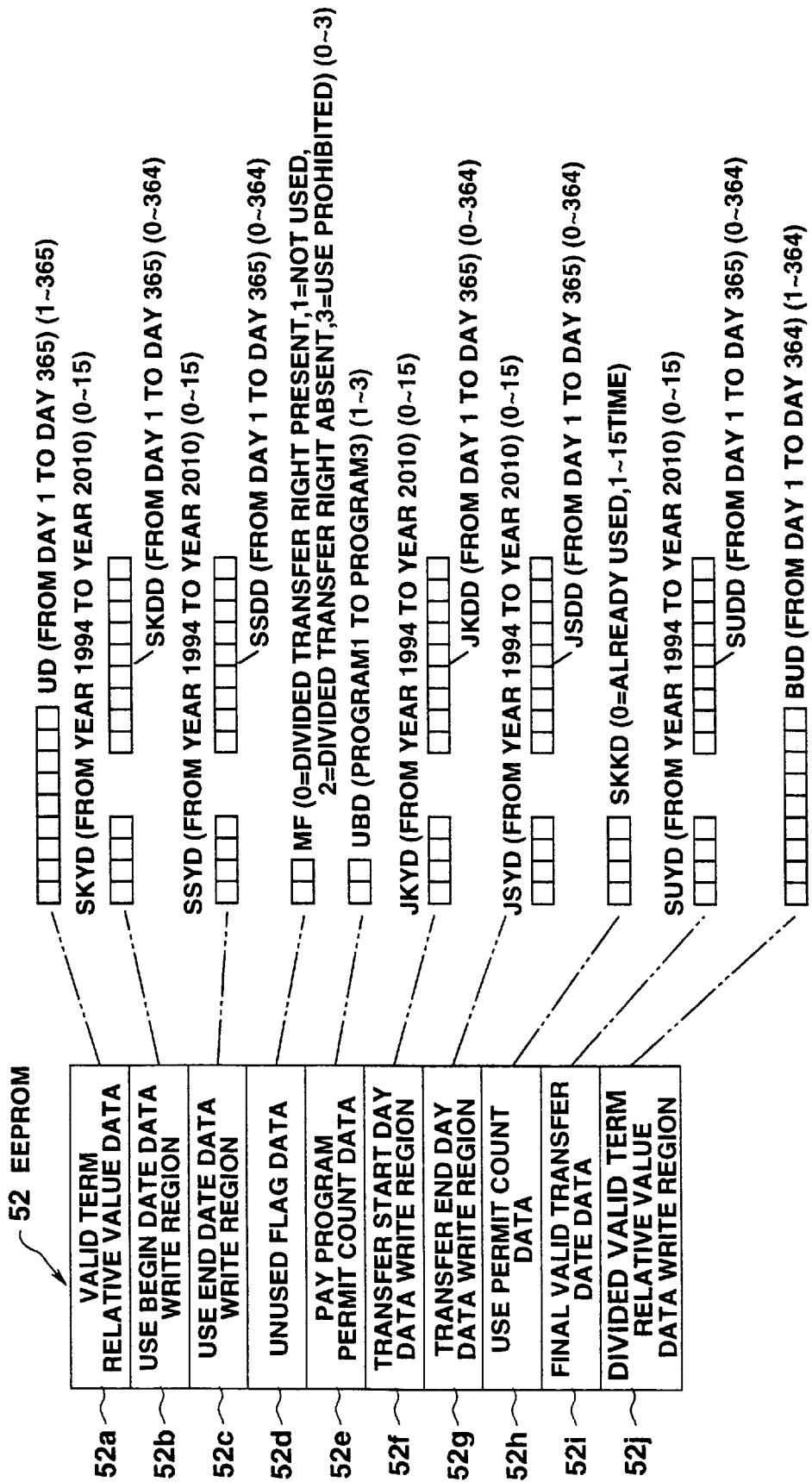
FIG. 7 is an explanatory diagram showing a constitution of an EEPROM of the IC card.

FIG. 7 shows a memory area structure of the EEPROM 52 in the IC card 2, in which are provided a valid term relative value data memory region 52a, an use begin date data write region 52b, an use end date data write region 52c, an unused flag data memory region 52d, a pay program permit count data memory region 52e, a transfer start date data write region 52f, a transfer end date data write region 52g, a use permit count data memory region 52h, a final valid transfer date data memory region 52i, and a divided valid term relative data write region 52j. In the valid term relative value data memory region 52a, the valid term relative value data UD is stored preliminarily, and this valid term relative value data UD comprises 9-bit data showing the relative valid term of any one of "1" to "365" in the unit of day, and the data showing "182" in the case of, for example, 6 months, or the data showing "365" in the case of 12 months is preliminarily stored, for example, before shipping from factory.

In the use begin date data write region 52b, by the procedure mentioned later, the use begin year data SKYD and the use begin date data SKDD are written. The use begin year data SKYD is written in 4-bit data showing the year from "1994" to "2010", and the use begin date data SKDD is written in 9-bit data of "0" to "364" corresponding to day 1 to day 365. For example, when the use begin date is Dec. 31, 1994, 4-bit data showing "1994" is written as SKYD, and 9-bit data showing "364" corresponding to December 31 is written as SKDD.

In the use end date data write region 52c, by the procedure mentioned later, the use end year data SSYD and use end month/day data SSDD are similarly written in 4-bit data showing the year from "1994" to "2010", and in 9-bit data of "0" to "364" corresponding to day 1 to day 365. Moreover, in the unused flag memory region 52d, for example, flag MF=1 showing no use is preliminarily written before shipping from factory, and this flag MF is changed by the procedure shown below into MF=0 showing divided transfer presence, MF=2 showing divided transfer absence, or MF=3 showing prohibition of use.

In the pay program permit count data memory region 52e, the pay program permit count data UBD ("2" in this embodiment) is written preliminarily before shipping from factory, and this pay program permit count data UBD is any number from "1" to "3" corresponding to program 1 to program 3.

Furthermore, in the transfer start date data write region 52f, by the procedure mentioned below, the transfer start year data JKYD and transfer start date data JKDD are written. The transfer start year data JKYD is written in 4-bit data showing the year from "1994" to "2010", and the transfer start date data JKDD is written in 9-bit data of "0" to "364" corresponding to day 1 to day 365. In the transfer end date data write region 52g, too, by the procedure mentioned below, the transfer end year data JSYD and transfer end month/day data JSDD are written similarly in 4-bit data showing the year from "1994" to "2010" and in 9-bit data of "0" to "364" corresponding to day 1 to day 365.

In the use permit count data memory region 52h, the use permit count data SKKD is written, for example, before shipping from the factory. This use permit count data SKKD is any value from "1" to "15", and is updated up to "0" indicating complete use by the subsequent procedure.

In the final valid transfer date data memory region 52i, the final valid transfer year data SUYD and final valid transfer date data SUDD are similarly written, in 4-bit data showing the year from "1994" to "2010" and 9-bit data of "0" to "364" corresponding to day 1 to day 365, for example, before shipping from the factory.

In the divided valid term relative value data write region 52j, the divided valid term relative value data BUD (any value from "1" to "364") is written by the procedure mentioned later.

The valid term relative value data UD, the pay program permit count data UBD, and the use permit count data SKKD have values dependent on the type and price of the IC card 2. The values become large as the price is high. For example, it is desirable to set the price is of the IC card 2 such that the price per one count is low if the use permit count data SKKD has a large value.

Figure 8:
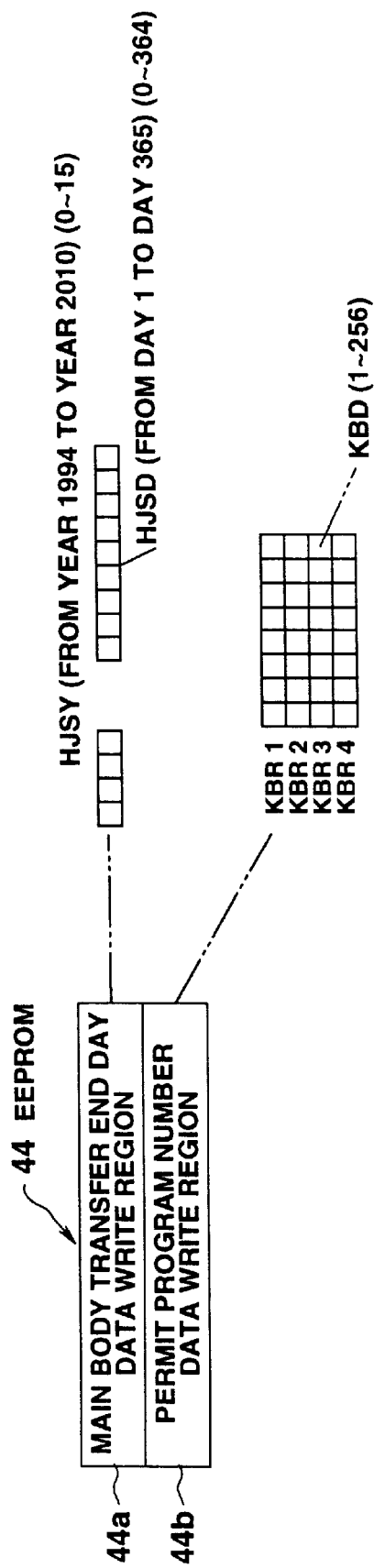
FIG. 8 is an explanatory diagram showing a constitution of an EEPROM of the service information receiving apparatus of the embodiment.

In the EEPROM 44, as shown in FIG. 8, a main body transfer end date data write region 44a and a permit program number data write region 44b are provided. In the main body transfer end date data write region 44a, a main body transfer end year data HJSY and a main body transfer end month/day data HJSD are written in 4-bit data showing the year from "1994" to "2010", and in 9-bit data of "0" to "364" corresponding to day 1 to day 365. The main body transfer end year data HJSY and the main body transfer end month/day data HJSD represent end year and end month/day of a valid term of the service information receiving apparatus 1 transferred (assigned) to from the IC card 2 and capable of receiving the pay broadcast. These data HJSY, HJSD should be written after the IC card 2 is attached, however, for the convenience of procedure mentioned later, the shipping date of this service information receiving apparatus 1 is stored preliminarily as the main body transfer end year data HJSY and the main body transfer end month/day data HJSD.

In the permit program number data write region 44b, the permit program number data KBD (any value from "1" to "N") is written by the procedure mentioned below.

The permit program number registers KBR1 to KBR3 store the program numbers determined as pay view, and always "0" is stored in KBR4.

Figure 9:
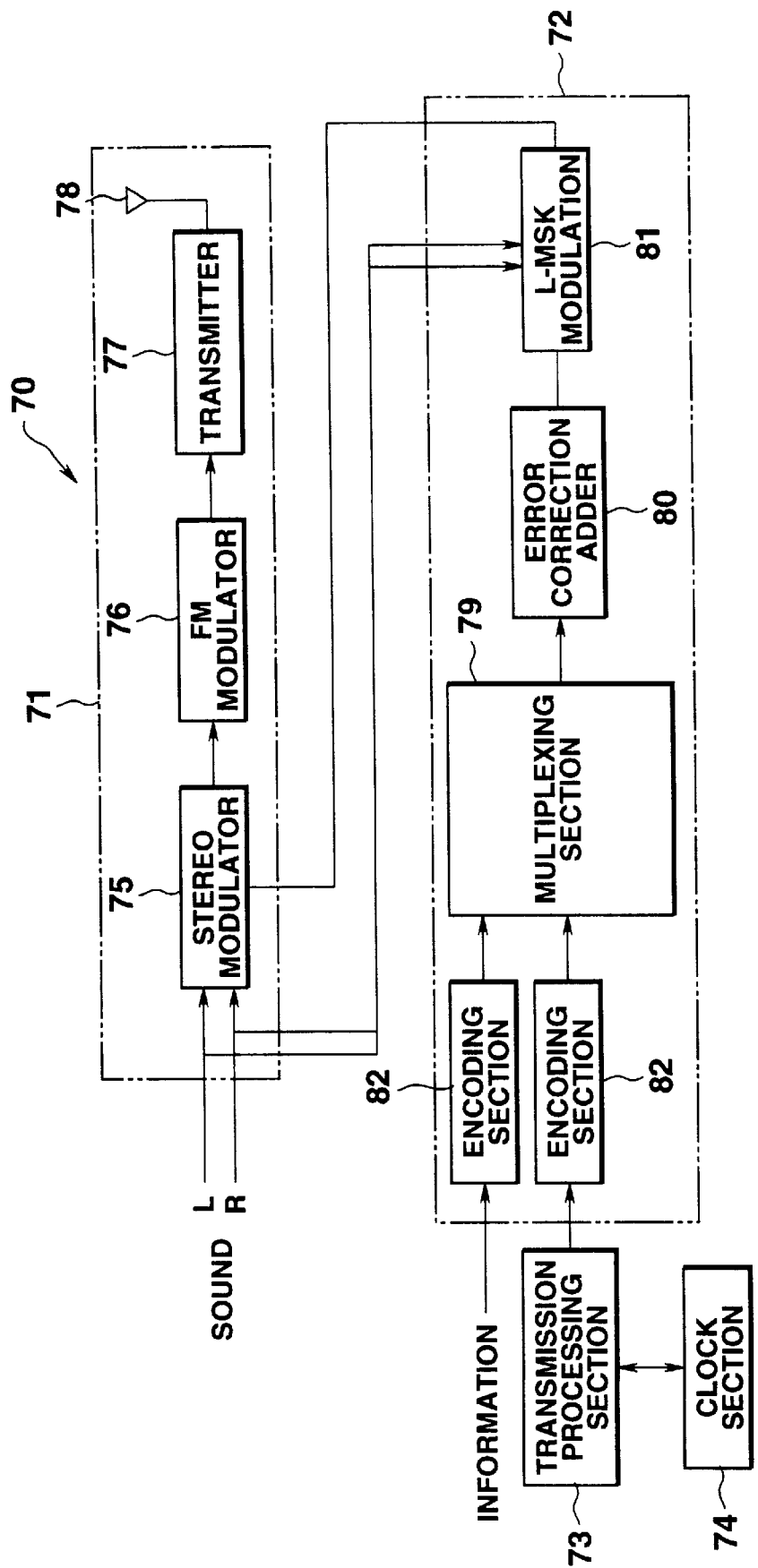
FIG. 9 is a block diagram showing a constitution of a service information transmitting apparatus of the embodiment.

FIG. 9 shows a service information transmitting apparatus 70 arranged in the FM broadcasting station 3, and this service information transmitting apparatus 70 comprises a transmitting unit 71, a multiplex processor 72, a transmission processor 73 for sending out the following pay service information and free service information to the multiplex processor 72, and a clock 74 for generating the present date data. The transmitting unit 71 comprises a stereo modulator 75 for performing stereo modulation of sound information, an FM modulator 76, a transmitter 77, and a transmitting antenna 78. The multiplex processor 72 comprises encoders 82, 82, a multiplexer 79, an error correction adder 80, and an L-MSK modulator 81.

Figure 10:
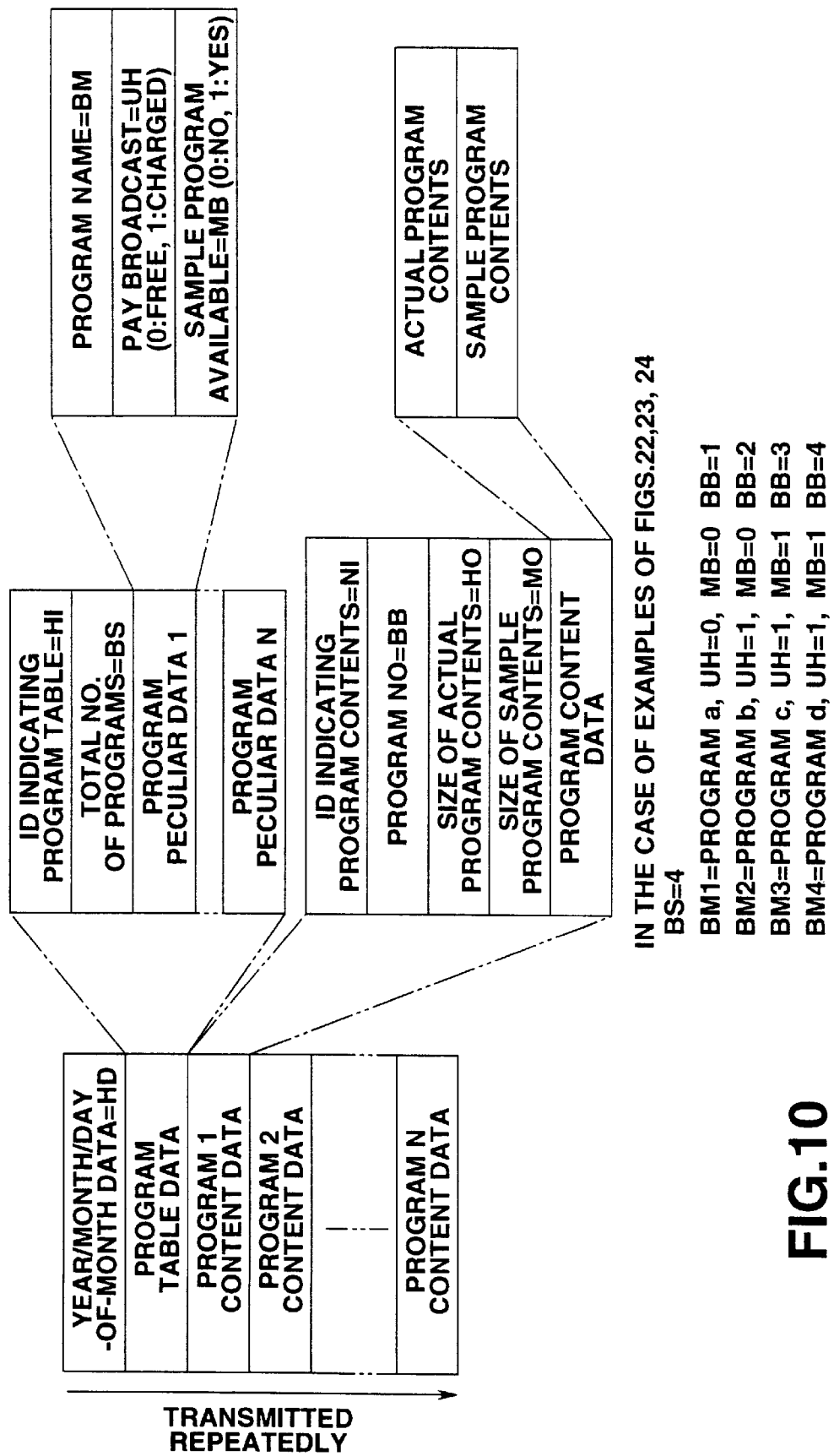
FIG. 10 is a transmission signal format diagram of service information.

The transmission signal format of service information multiplexed on the FM broadcast wave is described below while referring to FIG. 10. The transmission information of service information comprises year/month/day data HD, program schedule (table) data, and program content data of program 1 to program N as subsequent service information, and this series of data is transmitted repeatedly. The program schedule data comprises ID showing program schedule (ID=HI), total number of programs BS, and program individual (peculiar) data of program 1 to program N. The program individual data comprises program name BM, pay broadcast code UH ("0" for free, "1" for pay), and sample program presence/absence code MB ("0" for sample program absence, "1" for sample program presence).

The individual content data of program 1 to program N comprises ID showing program content (ID=NI), program number BB having a different number for program 1 to program N, data HO showing data quantity of regular program content, data MO showing data quantity of sample program content, and program content data. The program content data comprises the regular program content which is the content of the service information to be displayed, and the sample program content which is the sample of this service information.

Only the pure data is shown, but actually it is transmitted by check sum for error correction, ciphering process, etc. In the reception data memory 47, a memory area comprising the same constitution as the transmission signal format shown in FIG. 9 is provided, and all data of the service information shown in the diagram is stored in the memory area of the reception data memory 47.

Figure 11:
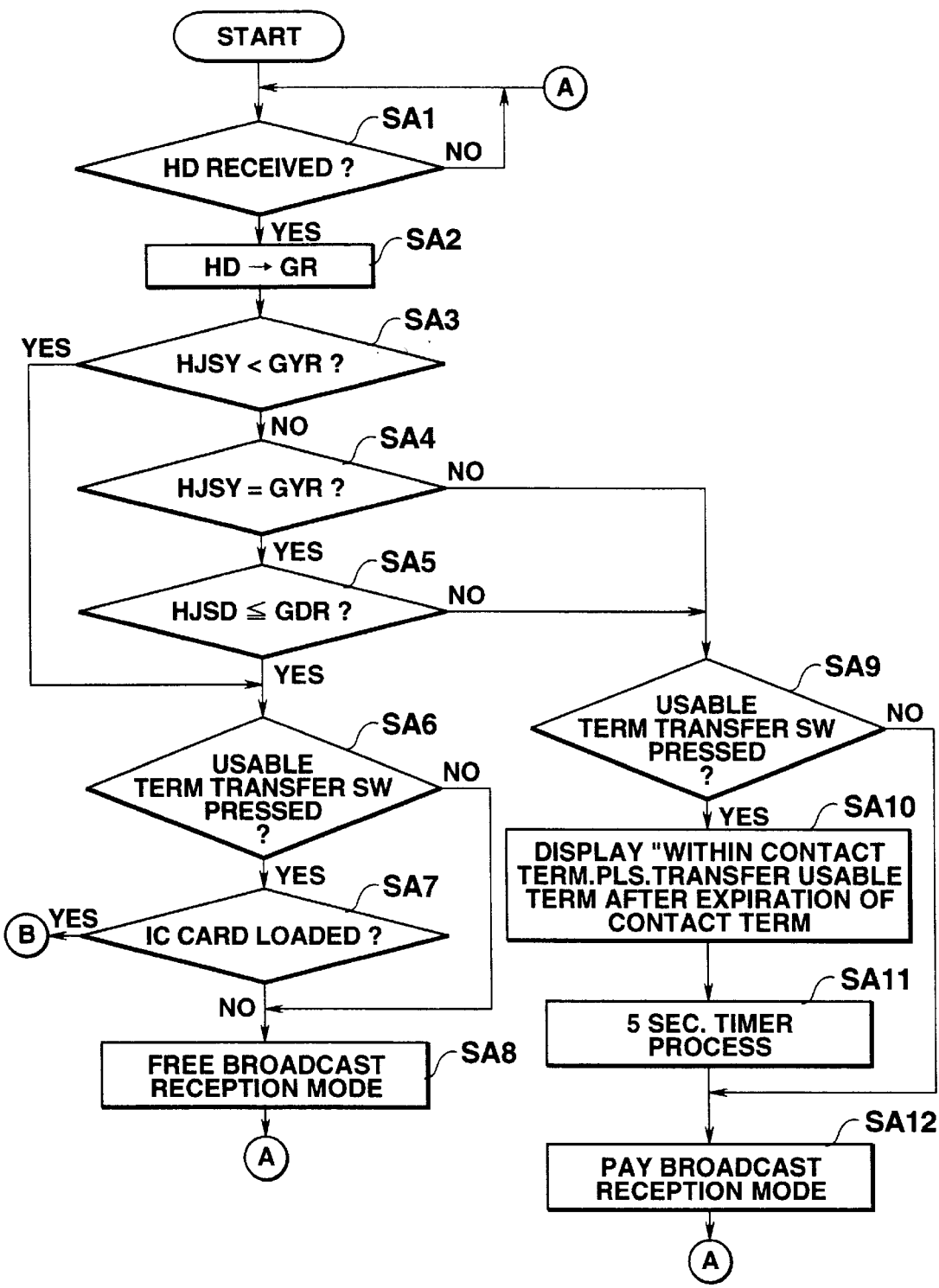
FIG. 11 is a flowchart showing a part of procedure of the service information receiving apparatus of the embodiment.

The operation of the service information receiving apparatus 1 is explained below according to the flowchart shown in FIG. 11 and after. In the flow chart, the following data and registers provided in the controller 43 are used.

Year/month/date data HD: Composed of 4-bit data showing the year from "1994" to "2010" and 9-bit data of "0" to "364" corresponding to day 1 to day 365, same as the use end year data SSYD and use end month/day data SSDD.

Present year data register GYR: Composed of 4 bits, storing the present year from "1994" to "2010".

Present date data register GDR: Composed of 9 bits, storing the present date of "0" to "364" corresponding to day 1 to day 365.

(Meanwhile, GR is used to indicate both registers GYR and GDR.)

Date operation register HZR: Storing intermediate data when calculating the use end month/day.

Transfer operation register JZR: Storing the number of days of the pay broadcast receiving valid term remaining in the IC card 2, for transferring from the IC card 2 to another main body apparatus.

Program permit operation register BZR: Storing the intermediate data when calculating the number of permit programs.

Increment register NR: Storing the value for specifying KBR1 to KBR4.

That is, the controller 43 in the service information receiving apparatus 1 starts operation according to a series of flow charts shown in FIG. 11 to FIG. 15 when the power switch 21 is turned on, and monitors reception of multiplex broadcast year/month/day data HD (step SA1). When the year/month/day data HD is received, the year/month/day data HD is stored in the GR. Herein, as stated above, since the GR indicates both GYR and GDR registers, of the received year/month/day data HD, the 4-bit present year data is stored in the present year data register GYR, and the 9-bit present date data is stored in the present month/date data register GDR (step SA2).

Consequently, the main body transfer end year data HJSY written in the main body transfer end date data write region 44a of the EEPROM 44, and the present year data stored in the GYR are compared, and it is judged if HJSY<GYR or not (step SA3). This main body transfer end year data HJSY indicates, as shown in step SA35 in FIG. 13 and step SA53 in FIG. 15, the year of the end of the valid term capable of receiving the pay broadcast which is transferred from the IC card 2 to the service information receiving apparatus 1 side. Therefore, as a result of judgment at step SA3, if the relation is HJSY<GYR, it is over the terminal year of the transfer valid term capable of receiving the pay broadcast transferred from the IC card 2 to the service information receiving apparatus 1 side, and in this case, without judging at step SA4 and step SA5, the procedure goes to step SA6. If the relation is not HJSY<GYR, it is judged if the main body transfer end year data HJSY and the present year data stored in the GYR are equal or not (step SA4). As a result of this judgment, if HJSY≠GYR, it is before the terminal year of the transfer valid term, and it is evident that the present time is within the transfer valid term, and hence by procedure as in step SA9 to step SA11 mentioned below, the pay broadcast reception mode is set (step SA12).

However, if HJSY=GYR and the transfer end year data and the present year data coincide, the main body transfer end month/day data HJSD written in the main body transfer end date data write region 44a and the present date data stored in the GDR are compared (step SA5). This main body transfer end month/day data HJSD indicates, as shown in step SA35 in FIG. 13 and step SA53 in FIG. 15, the date of the end of the transfer valid term capable of receiving pay broadcast transferred from the IC card 2 side to the service information receiving apparatus 1 side as mentioned below. Therefore, as a result of judgment at step SA5, if HJSD≦GDR, it is already past the transfer valid term, and the procedure goes to step SA6. If, however, HJSD>GDR, it is before the main body transfer termination, and after executing the procedure at step SA9 to step SA11 shown below, the pay broadcast reception mode is set (step SA12).

Incidentally, when using the service information receiving apparatus 1 for the first time after purchase, as mentioned above, the shipping date of this service information receiving apparatus 1 is preliminarily stored in the main body transfer end date data write region 44a of the EEPROM 44, as the main body transfer end year data HJSY and main body transfer end month/date data HJSD. The shipping data is always before the time the user starts to use the service information receiving apparatus 1. Therefore, when the service information receiving apparatus 1 is used for the first time, the operation proceeds in the sequence of step SA3 to step SA6, or step SA3 to step SA4 to step SA5 to step SA6. At step SA6, judging if the usable term transfer SW 91 is pressed or not, and if not pressed, the free broadcast reception mode is set (step SA8). Although passing the transfer valid term, if the usable term transfer SW 91 is pressed, it is judged if the IC card 2 is loaded in the slot 22 or not (step SA7). If the IC card 2 is not loaded, the free broadcast reception mode is set (step SA8).

That is, when today is before the main body transfer termination date written in the main body transfer end date data write region 44a of the EEPROM 44 and within the transfer valid term, whether the IC is card 2 is loaded or not, the pay broadcast reception mode is set (step SA12), and if passing over the transfer valid term, when the usable term transfer SW 91 is not pressed or when IC card 2 is not loaded if the usable term transfer SW 91 is pressed, the free broadcast reception mode is set (step SA8).

Figure 12:
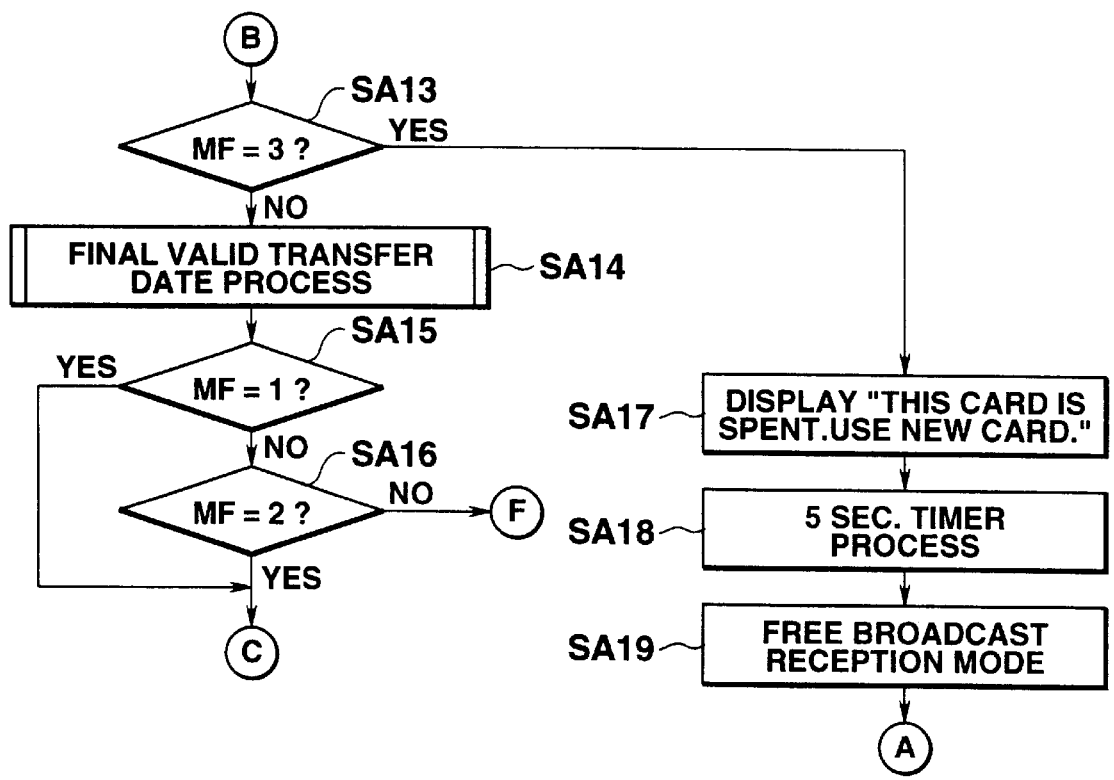
FIG. 12 is a flowchart following FIG. 11.

If surpassing the transfer valid term, when the usable term transfer SW 91 is pressed and the IC card 2 is loaded, or the judgment is YES at step SA7, advancing from step SA7 to step SA13 in FIG. 12, it is judged if MF=3 or not. As a result of this judgment, if MF=3, the loaded IC card 2 has been already used up. Hence the LCD (display unit 6) displays "This card is spent. Use new card" (step SA17). Successively, by 5-second timer process (step SA18), this display continues for 5 seconds, and the free broadcast reception mode is set (step SA19).

That is, if the usable term transfer SW 91 is pressed and the IC card 2 is loaded, in case it is past the transfer valid term and the IC card 2 is used up, the free broadcast reception mode is set. In the setting of free broadcast reception mode, by this display (SA17), the reason why the pay broadcast reception mode is not set is indicated, avoiding the misunderstanding that the service information receiving apparatus 1 is defective or the IC card 2 is defective, and thereby urging the user to purchase an IC card 2.

On the other hand, as a result of judgment at step SA18, if not MF=3, the loaded IC card 2 has not transferred the valid term of the IC card 2 to the service information receiving apparatus 1 main body or other apparatus main body, until the count indicated by the use permit count data SKKD. In this case, the final valid transfer date process (step SA14) is executed as mentioned later. Afterwards, it is checked if MF=1 or not (step SA15). As a result of this judgment, if not MF=1, advancing to step SA16, it is judged if MF=2 or not. If MF=2, the loaded card IC2 is not provided with divided transfer which is described below.

If MF=1 as a result of judgment at step SA15, the loaded IC card 2 is unused, and, in this case too, the IC card 2 is not provided with divided transfer.

Figure 13:
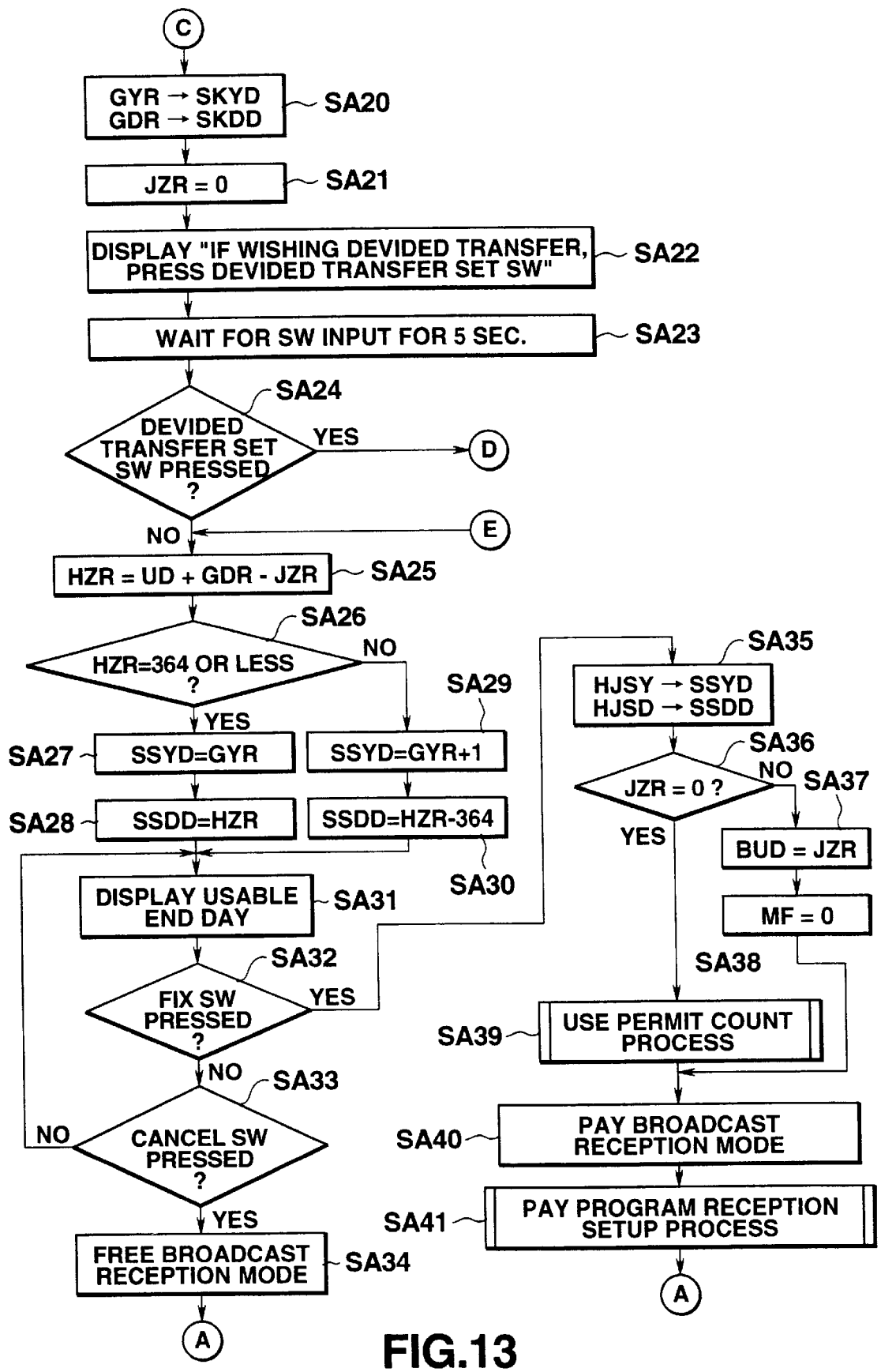
FIG. 13 is a flowchart following FIG. 12.

Hence, if the judgment is YES at step SA15 or step SA16, that is, if the IC card 2 is not used up, and is not provided with divided transfer, the procedure advances to step SA20 in FIG. 13, and the present year data stored in the GYR is written into the use begin date data write region 52b of the EEPROM 52 as the use begin year data SKYD, while the present date data stored in the GDR is written into the same use begin date data write region 52b as the use begin date data SKDD (step SA20).

After setting "0" in the transfer operation register JZR (step SA21), the display unit 6 displays "If you wish divided transfer, press divided transfer setting SW" (step SA22). Therefore, as the user visually recognizes this message shown in the display unit 6, the transfer operation can be done easily. Then, maintaining a 5-second SW waiting state (step SA23), after 5 seconds, it is judged if the divided transfer setting SW 92 has been pressed or not (step SA24). When the user presses the divided transfer setting SW 92 according to the display, advancing from step SA24 to the flow in FIG. 14, the loop of step SA42 to step SA43 to step SA42 is repeated until either the term shortening SW 93 or enter SW 94 is pressed.

While waiting by repeating this loop, when the user pressed the term shortening SW 93, the value of transfer operation register JZR is increased by one (step SA44). This transfer operation register JZR is intended to transfer, as mentioned above, from the IC card 2 later to the other (or own) apparatus main body, and to store the number of days of the pay broadcast reception valid term left over in the IC card 2. At next step SA45, it is judged if the increased JZR value is UD-1 or not, that is, if the value of JZR is the remaining valid term subtracting one for today from the valid term relative value data UD or not (step SA45). As a result of this judge, if it is still JZR<UD-1, back to step SA42, the procedure is in waiting state by repeating the same loop. Therefore, after pressing the divided transfer set SW 92, when the term shortening SW 93 is pressed, the value of JZR increases by the procedure of step SA44 every time the term shortening SW 93 is pressed.

As the user presses the term shortening SW 93 until JZR=UD-1, all days except for one day (today) of the valid term set in the IC card 2 are left over in other apparatus main body, and the value of JZR cannot be increased further. Hence, in such a case, regardless of manipulation of the enter SW 94, the procedure returns from step SA45 to step SA25 in FIG. 13. Within the valid term of IC card 2, after leaving a desired number of days in order to transfer to the other apparatus main body, if it is still JZR<UD-1, the moment the enter SW 94 is pressed, the procedure returns from step SA45 to step SA25. That is, the user, after pressing the divided transfer setting SW 92, presses the term shortening SW 93 by a desired number of times and then presses the enter SW 94, and then an arbitrary number of days (within UD-1) corresponding to the number of times of pressing of the term shortening switch SW 93 can be left over for transferring to the other service information receiving apparatus 1, and the number of remaining days for transferring to the other service information receiving apparatus 1 is displayed by the JZR. At step SA25 in FIG. 13, after step SA24, step SA43 and step SA45, the valid term relative value data UD is read out from the valid term relative value data memory region 52a of the EEPROM 52, the valid term relative value data UD and the present data stored in GDR are added, and the value of the transfer operation register JZR is subtracted, and this value is stored in the date operation register HZR (step SA25).

That is, based on UD+GDR having the value of the valid term relative value data UD of the IC card 2 added to the present date data showing today stored in the GDR, the usable termination date (valid term expiration date) of the IC card 2 starting from today is obtained. Besides, since the JZR stores the data showing the number of days of the pay broadcast receiving valid term left over to transfer from the IC card 2 to the other apparatus main body, based on UD+GDR–JZR, the data showing the valid term subtracting the transfer portion to the other apparatus main body is obtained, and the data showing the termination date of this valid term is stored in the HZR. Of course, if the divided transfer is not set in step SA42 to step SA45 mentioned above, since JZR=0 by the procedure at step SA21, UD+GDR is stored in the HZR.

In succession, it is judged if the value of HZR is "364" or less (step SA26). Herein, if the value of the HZR is "364" or less, without carrying up the value of year, the termination year and termination data are shown by the values of the GYR storing the present year data and HZR storing the valid term termination date data. In this case, therefore, the present year data stored in the GYR is directly written into the use end date data write region 52c as the use end year date SSYD (step SA27), and the valid term end data stored in the HZR is written into the same use end date write region 52c as the SSDD (step SA28).

As a result of judgment at step SA26, however, if the value of HZR exceeds "364", unless the value of "year" is carried up, the termination date cannot be expressed by the numerical value of "0" to "364" corresponding to day 1 to day 365. Accordingly, the present year data stored in the GYR is increased, and the increased value is written as the termination year data SSYD in the use end date data write region 52c (step SA29). In succession, subtracting "364" from the valid term end month/day data stored in the HZR, the value is written as the use end month/day data SSD in the same use end date data write region 52c (step SA30).

At step SA31 next to step SA28 and step SA30, the use end month/day of this apparatus main body indicated by SSYD and SSDD (the terminal day of the valid term transferred from the IC card 2) is displayed by the LCD (display unit 6). Therefore, the user visually recognizes the message of the display unit 6, and knows how long this apparatus main body can receive the pay broadcast.

Repeating the loop of step SA31 to step SA33 until either the enter SW 94 or cancel SW 95 is pressed, the waiting state continues. While waiting by repeating this loop, when the user presses the cancel SW 95, the free broadcast reception mode is set (step SA34), thereby returning to step SA1.

The flow advances to step SA 35 from step SA 32 if the enter SW 94 is depressed without depressing the cancel SW 95. The value of SSYD and the value of SSDD are written into the main body transfer end date data write region 44a of the EEPROM 44 as the main body transfer end year data HJSY and main body transfer end month/day data HJSD. Therefore, as this procedure of step SA35 is executed, at the time of repeated execution of the procedure from step SA1, the pay broadcast reception mode (step SA12) is set continuously in a range of step SA3 to step SA5 in FIG. 11, until becoming HJSY<GYR (YES at step SA3), or HJSY=GYR and HJSD≦GDR (YES at both step SA4 and step SA5). That is, the remaining valid term subtracting the valid term left over for transferring to the other main body apparatus at step SA42 to step SA45, from the valid term stored in the IC card 2 is the term capable of receiving the pay broadcast in the service information receiving apparatus 1 incorporating the IC card 2.

At step SA36 next to step SA35, judging if transfer operation register JZR=0 or not. If JZR=0, since there is no remaining valid term for transferring to other apparatus main body, the use permit count process mentioned later is carried out (step SA39). However, if JZR≠0, there is a remaining valid term for transferring to other apparatus main body, and hence the value of this remaining term stored in the register JZR is written into the divided valid term relative value data write region 52j of the EEPROM 52 as the divided valid term relative value data BUD of the IC card 2 (step SA37), and "0" is set as unused flag MF so as to indicate the divided transfer right presence (step SA38). At step SA40 following step SA38 and step SA39, the pay broadcast reception mode is set, and further the pay program reception setup process (step SA41) described below is executed, thereby returning to step SA1.

Figure 14:
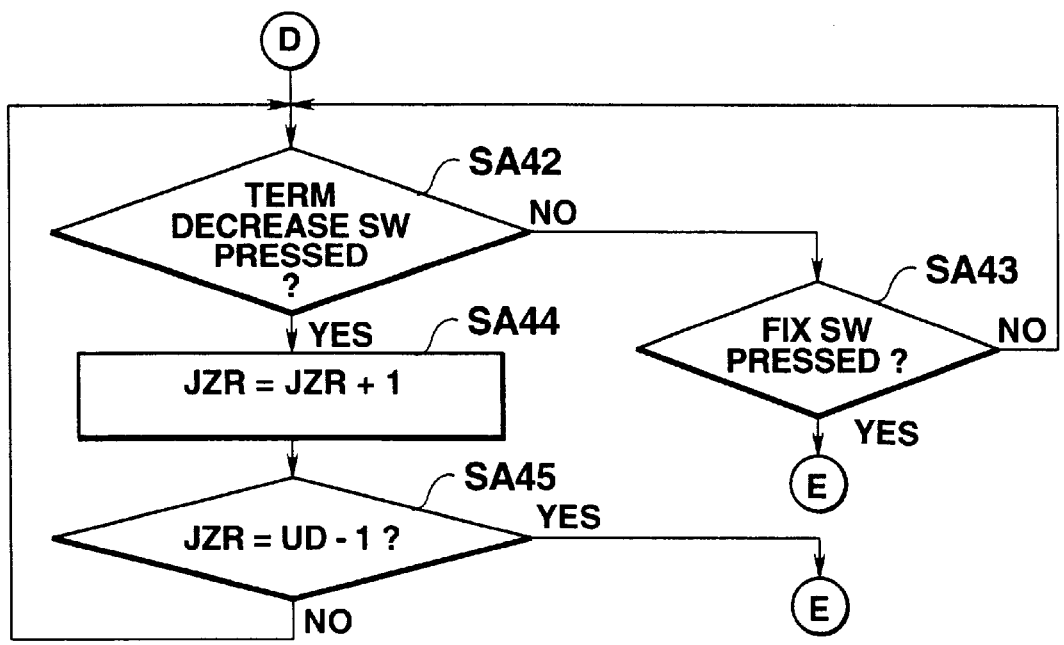
FIG. 14 is a flowchart following FIG. 13.
Figure 15:
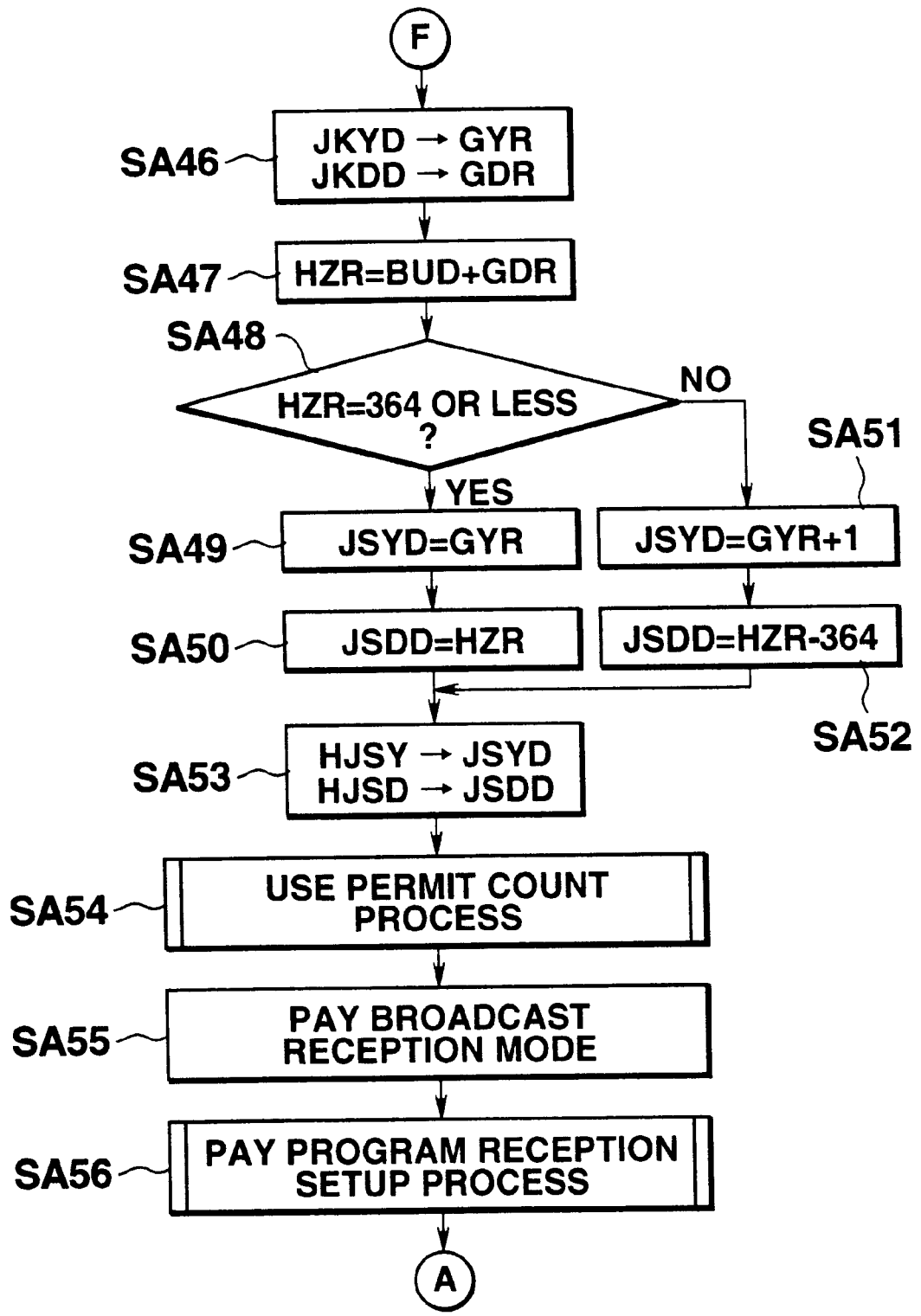
FIG. 15 is a flowchart following FIG. 12.

On the other hand, when the unused flag MF≠2 as a result of judgment at step SA16, the procedure advances to flow in FIG. 15. Herein, the unused flag MF is any of "0", "1", "2", and "3", and therefore when the judgments are all NO at step SA13, step SA15 and step SA16, then MF=0, and it indicates that the loaded IC card 2 has the divided transfer right. Hence, in the case of MF=0, showing the presence of divided transfer right, the procedure advances from step SA16 to the flow in FIG. 15. Therefore, the procedure at step SA46 to step SA56 shown in FIG. 15 is executed in the following cases:

(1) In the case of the IC card 2 loaded in other apparatus main body and set in the divided transfer shown in FIG. 14, when the IC card 2 removed from the other apparatus main body is loaded into this apparatus main body, and (2) In the case of the IC card 2 loaded in this apparatus main body and set in the divided transfer shown in FIG. 14, when the IC card 2 removed from this apparatus main body is loaded again into this apparatus main body.

As an example of the case (2), specifically, an IC card 2 worth six months is used for two months, leaving the portion of four months by divided transfer setting, and after the lapse of eight months, the same IC card 2 is put into the same apparatus main body, and the portion of the remaining four months is to be used.

That is, first, the present year data stored in the GYR is written into the transfer start date data write region 52f of the EEPROM 52 as the transfer start year data JKYD, and the present date data stored in the GDR is written into the same transfer start date data write region 52f as the transfer start date data JKDD (step SA46). Next, reading the divided valid term relative value data BUD from the divided valid term relative value data memory region 52J of the EEPROM 52, this divided valid term relative value data BUD and the present date data stored in the GDR are added, and the sum is stored in the date operation register HZR (step SA47). Herein, the divided valid term relative value data BUD does not show the original valid term of the IC card 2, but is the value written at step SA37.

In succession, it is judged if the value of HZR is "364" or less or not (step SA48). If the value of HZR is "364" or less, without having to carry up the value of year, the transfer end date can be indicated based on the present year and the present date+divided valid term relative value data. Hence, in this case, the present year data stored in the GYR is directly written into the transfer end date data write region 52g as the transfer end year data JSYD (step SA49), and the "present date+divided valid term relative value data" stored in the HZR is written into the same transfer end date data write region 52g as the transfer end month/day data (step SA50).

Consequently, the transfer end year data JSYD and transfer end month/day data JSDD are written into the main body transfer end date data write region 44a of the EEPROM 44 as the main body transfer end year data HJSY and main body transfer end month/day data HJSD (step SA55). By this procedure, the divided valid term divided and left over in the IC card 2 is transferred to the apparatus main body side. As a result, the divided valid term of the IC card 2 is used up, and the use permit count process mentioned later is executed (step SA54), and then the pay broadcast reception mode is set (step SA55), and further the pay program reception setup process (step SA56) is executed, thereby returning to step SA1.

As a result of judgment at step SA48, if the value of HZR is over "364", unless the value of "year" is carried up, the transfer end date cannot be expressed by the numerical value of "0" to "364" corresponding to day 1 to day 365. Accordingly, the value of the present year data stored in the GYR is increased by one, and the increased value is written into the transfer end date data write region 52f as the transfer end year data JSYD (step SA51). Subtracting "364" from the value stored in the HZR, the balance is written into the same transfer end date data write region 52f as the transfer end month/day data JSDD (step SA52). Then, by the procedure at step SA53 to step SA56 as mentioned above, the procedure returns to step SA1.

That is, as the procedure at step SA35 or step SA53 is executed, the valid term of the IC card 2 loaded in the slot 22 today is transferred to the apparatus main body side. As the procedure from step SA1 is executed repeatedly, until the valid term expires, NO in step SA3 and NO in step SA4 or step SA5, then the flow advances to step SA9, and whether the usable period transfer SW 91 is pressed or not, the pay broadcast reception mode (step SA12) is set continuously.

At this time, when the user presses the usable term transfer SW 91, advancing from step SA9 to step SA10, the LCD (display unit 6) displays "Still within usable term. After the usable term is over, transfer the usable term." By successive 5-second timer process (step SA11), after this display continues for 5 seconds, the pay broadcast reception mode is set (step SA12). Therefore, by this display, the user knows that it is within the usable term transferred to the apparatus main body and that pay broadcast can be received without trouble.

After step SA12, the procedure returns to step SA1, and hence if the usable term transfer SW 91 is pressed in this way before the usable term transferred to the apparatus main body expires, the procedure of step SA35 and step SA53 will not be executed, and procedure of step SA35 and step SA53 is prohibited. Therefore, before the usable term transferred to the apparatus main body side expires, if the IC card 2 is loaded into the slot 22 and the usable term transfer SW 91 is pressed, the valid term of the IC card 2 will not be transferred to the apparatus main body. It hence prevents the inconvenience of canceling the valid term already transferred to the apparatus main body side, and by such operation, user's trouble can be prevented. In the embodiment, the term transfer from the IC card 2 side is prohibited before the usable term already transferred to the apparatus main body expires, but, alternatively, without prohibiting, the term newly transferred from the IC card 2 side can be added to the usable term already transferred to the apparatus main body.

Figure 16:
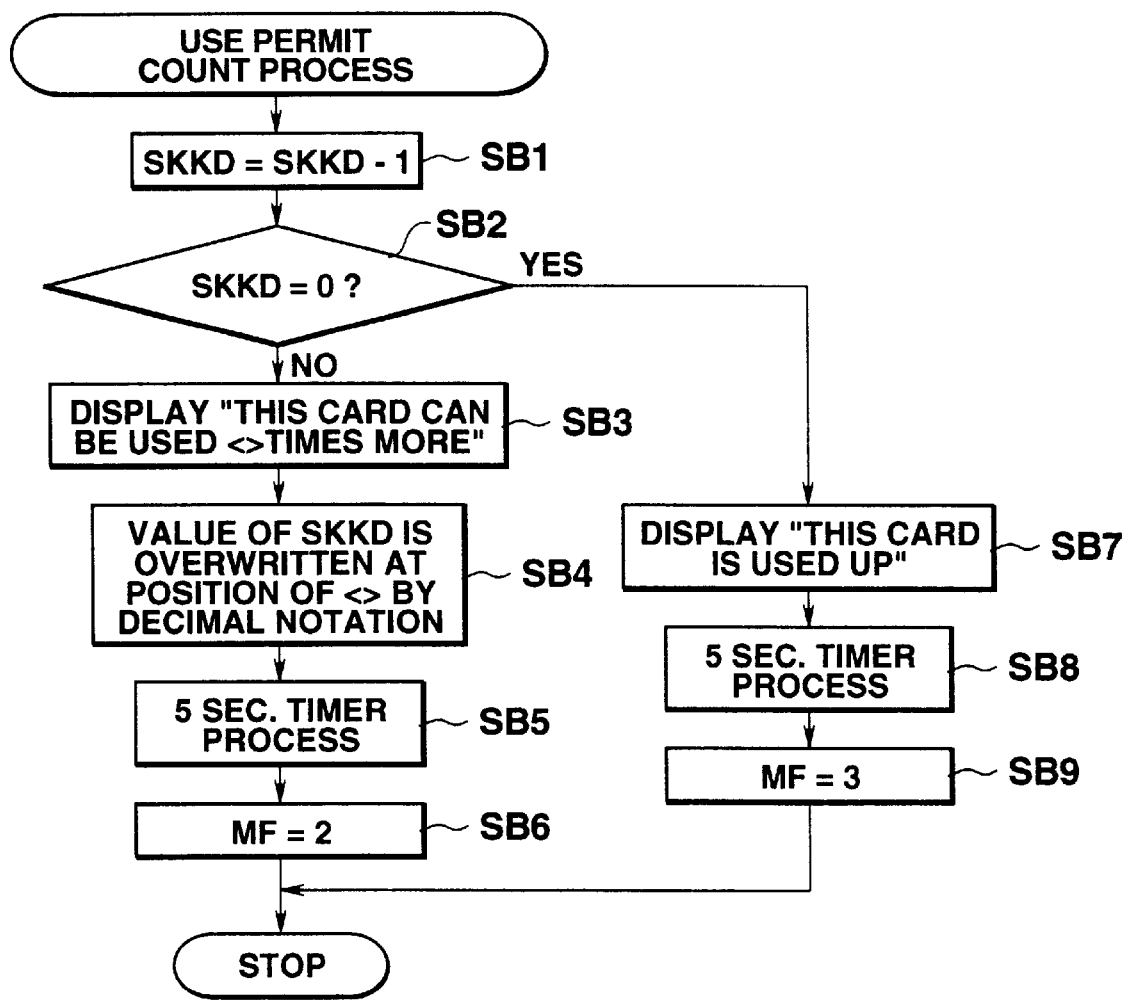
FIG. 16 is a flowchart showing a use permission count process.

The use permit count process (step SA39 and step SA54) is executed according to the flow shown in FIG. 16. That is, by this procedure, the valid term of one time of the IC card 2 is completely transferred to the apparatus main body, and the use permit count data SKKD stored in the use permit count data memory region 52h of the EEPROM 52 is decreased by one, and the resulting value is written into the same region 52h (step SB1). It is then judged if the value is "0" or not in this use permit count data SKKD (step SB2).

If SKKD=0 as a result of judgment, this IC card 2 is transferred of the valid term to the apparatus main body or other apparatus main body, for the number of times indicated by the use permit count data SKKD written, for example, before shipping from the factory. Hence, the LCD (display unit) 6 displays "This card cannot be used any more" (step SB7), and after successive 5-second timer process (step SB8), this display is kept for 5 seconds, and the unused flag MF is changed to MF=3 showing prohibition of use, and this use permit count process is over (step SB9). Therefore, the user of this IC card 2 sees this display and knows that the term is transferred by the full use permit count of the IC card 2 by the present term transfer.

That is, the IC card 2 used in the embodiment can be transferred to an arbitrary apparatus main body, for the valid term indicated by the valid term relative value data UD stored in the valid term relative value data memory region 52a, by the number of times indicated by the use permit count data SKKD stored in the use permit count data memory region 52e. Therefore, for example, the valid term indicated by the valid term relative value data US is three months, and the number of times indicated by the use permit count data SKKD is "10", the valid term for three months each can be transferred to a total of ten apparatus main bodies (in other words, this IC card 2 has a total valid term of three months×10=thirty months). Hence, for example, supposing a certain organization purchases one or a plurality of IC cards 2, members of the organization can commonly use the IC cards 2. In this case, as mentioned above, as for the use permit count data SKKD, by setting the price of the IC cards 2, so that the larger the value, the lower is the unit price for each count, a group discount is realized substantially.

Or, as a result of judgment at step SB2, if SKKD≠0, and there is remainder of use permit count, the LCD (display unit) 6 displays "This card can be used < > times more" (step SB3), and the value of SKKD is overwritten in the space of < > in decimal notation (step SB4). By successive 5-second timer process (step SB5), this display is kept for 5 seconds, and the unused flag MF is changed to MF=2 showing absence of divided transfer right, and this use permit count process is over (step SB6). Hence, the user having transferred the term by using this IC card 2 sees this display, and knows how many times it is possible to transfer the term from this IC card 2.

Figure 17:
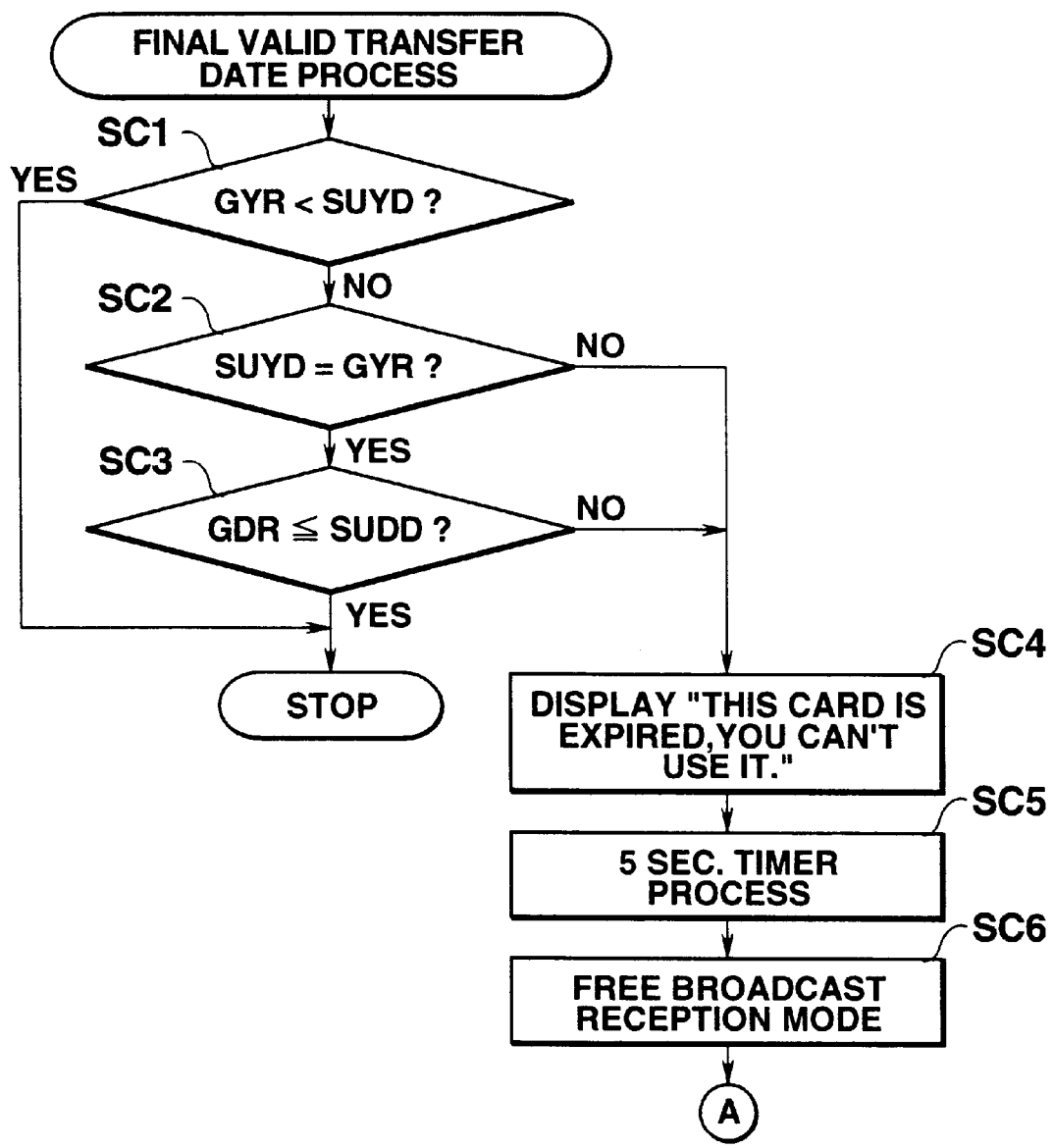
FIG. 17 is a flowchart showing a final valid transfer date process.

On the other hand, the final valid transfer date process (step SA14) is done according to the flowchart in FIG. 17. That is, the present year data stored in the GYR, and the final valid transfer year data SUYD stored in the final valid transfer date data memory region 52i of the EEPROM 52 are compared, and it is judged if GYR<SUYD (step SC1). As a result of judgment, if GYR<SUYD, it is evident that today is before the final valid transfer year of this IC card 2. Hence, in this case, without judging at step SC2 and step SC3, the final valid transfer date process (step SA14) is over, and the procedure after step SA15 described above is executed.

If not in the relation of GYR<SUYD, furthermore, the final valid transfer year data SUYD is judged if equal to the present year data stored in the GYR (step SC2). When judgment was NO at both step SC1 and step SC2, it is in the relation of GYR>SUYD, and today is already past the final valid term start year of this IC card 2, and the LCD (display unit) 6 displays "This card has expired. You can't use it" (step SC4). By 5-second timer process (step SC5), the display is kept for 5 seconds, and the free broadcast reception mode is set (step SC6), thereby returning to step SA1 in FIG. 11.

If SUYD=GYR, and the final valid transfer year data and present year data coincide, moreover, the present date data stored in the GDR and the final valid transfer date data SUDD stored in the final valid transfer date data memory region 52i are compared (step SC3). As a result of judgment, if coming in the relation of GDR≦SUDD, today is before the final valid transfer date of this IC card 2, and thereby finishing the final valid transfer date process (step SA14), the procedure after step SA15 is executed. However, not in the relation of GYR≦SUYD, today is past the final valid transfer data of this IC card 2, and hence the procedure of step SC4 to step SC6 described above is executed, and the above-mentioned display is shown, and after setting the free broadcast reception mode, the procedure returns to step SA1.

That is, if MF≠3 as a result of judgment at step SA13, and the IC card 2 is not prohibited of use, when this IC card 2 is used after the final valid transfer date, transfer of valid term to the main body (step SA35 and step SA53) or setting of pay broadcast reception mode (step SA40 and step SA55) is not effected, and only the free broadcast reception mode (step SC6) is set. Therefore, the user purchasing this IC card 2 attempts to transfer the valid term to plural apparatus main bodies to avoid substantial invalidation of the IC card 2 surpassing the final valid transfer date, so that the listeners of the pay broadcasting may be increased in number. Or, even if the use permit count has its remainder, when the specified date data stored in the IC card 2 is over, this IC card 2 is substantially invalid. Hence, if the company wishes to start a new fee charging system, after the specified date, it is not necessary to consider the presence of the IC cards 2 of the former fee charging system, so that the new fee charging system can be started smoothly.

In this embodiment, by the number of operations of the term shortening SW 93, the number of days of valid term to be transferred to other apparatus main body is specified, and the remaining days subtracting the specified days are transferred to this apparatus main body, but to the contrary, by specifying the number of days of valid term to be transferred to this apparatus main body by the number of times of operation of the term shortening SW 93, the remaining days subtracting the specified days may be transferred to the other apparatus main body.

Figure 18:
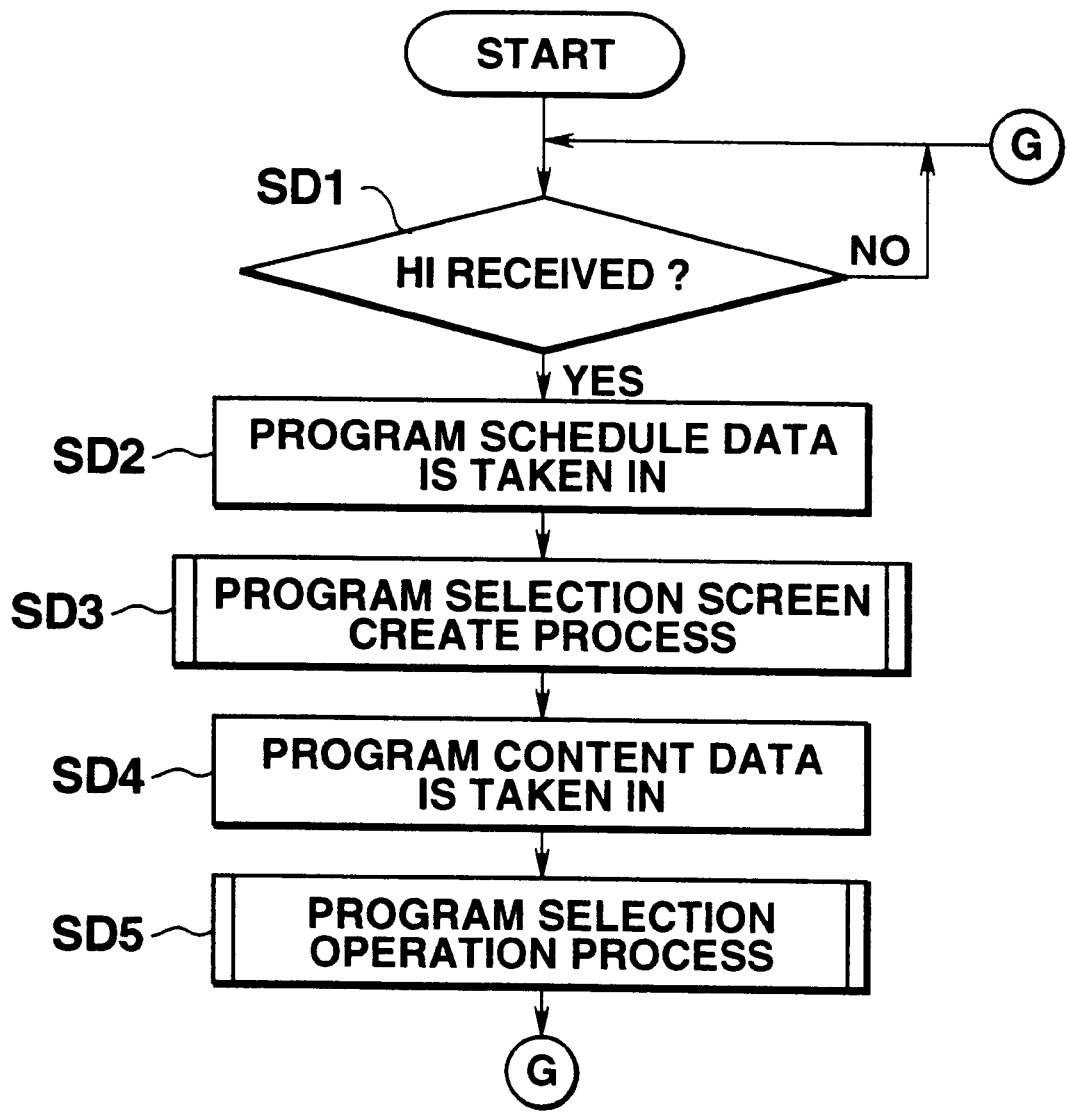
FIG. 18 is a flowchart showing a part of procedure of the service information receiving apparatus of the embodiment.

On the other hand, the controller 43 executes the procedure shown in FIG. 18 parallel to the foregoing procedure shown in FIG. 11 to FIG. 17. That is, monitoring the reception of HI which is the ID showing the program schedule (step SD1), when receiving HI, the program schedule data is taken in (step SD2), and the program select (menu) screen create process mentioned later is executed (step SD3). Afterwards, the program content data is taken in (step SD4), and the program select operation process (step SD5) is executed, thereby returning to step SD1.

Figure 19:
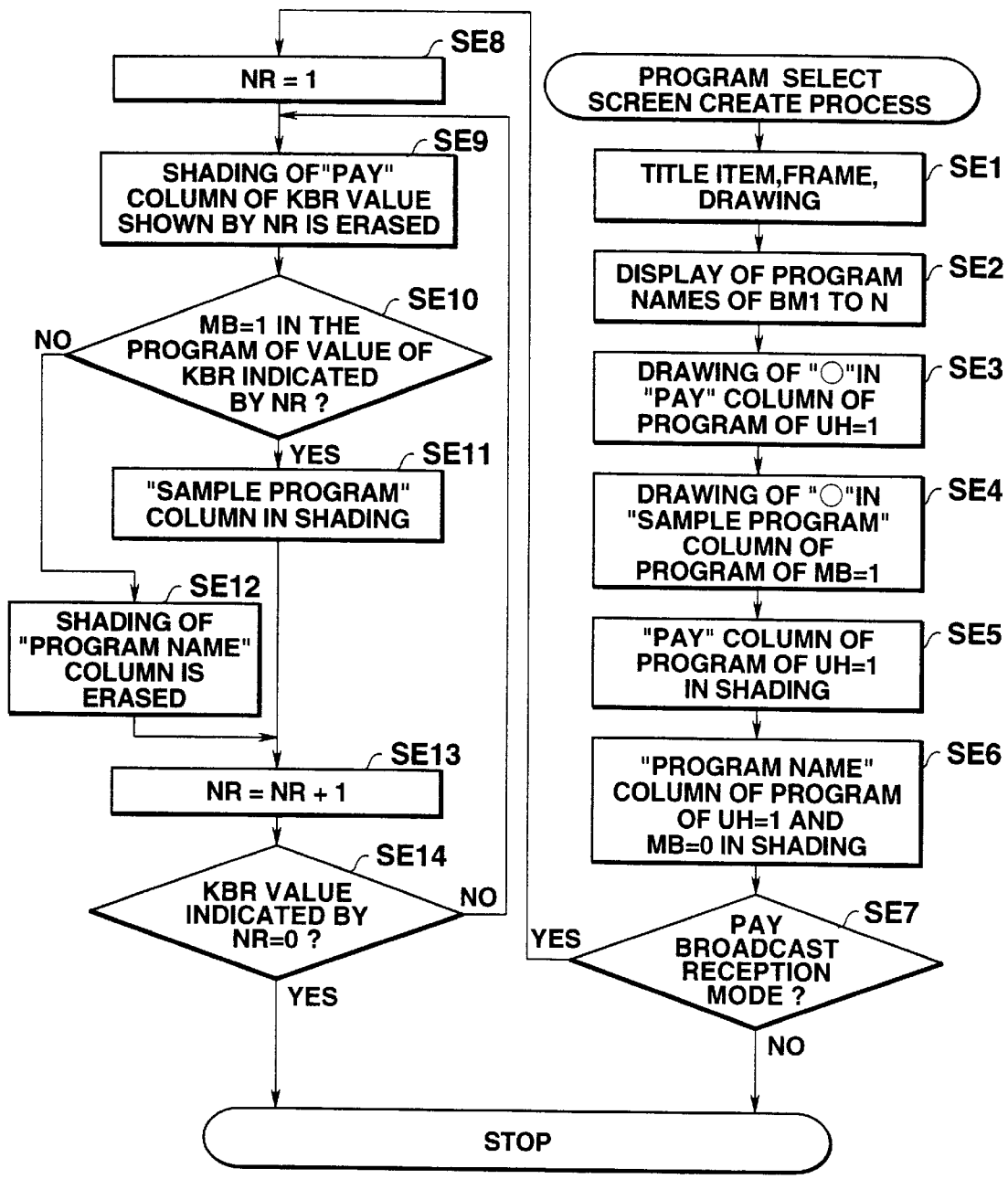
FIG. 19 is a flowchart showing a program selection screen creating process.

The program select screen create process (step SD3) is conducted according to the flow shown in FIG. 19, and after showing the title items and frame (step SE1), the program names of BM1 to BMN are displayed (step SE2). By this procedure at step SE1 and step SE2, as shown in FIG. 22, the display unit 6 shows the frame together with title items of program name, pay, and sample program. In succession, a circle is drawn in the "pay" column of the program as pay broadcast code UH=1 (step SE3), and a circle is drawn in the "sample program" column as sample program presence or absence code MB=1 (step SE4). Therefore, for example, when the reception signal possesses data as shown in FIG. 10, program "a" to program "d" are displayed in the program name column as shown in FIG. 22 by the above procedure, and the circle mark is indicated in program "b" to program "d" in the "pay" column, and the circle mark is indicated in program "c" and program "d" in the "sample program" column.

Successively, the "pay" column of program of pay broadcast code UH=1 is shaded (step SE5), and the "program name" column of the program of UH=1 and sample program presence or absence code MB=0 is also shaded (step SE6). By the procedure of step SE5 and step SE6, as shown in an example in FIG. 22, the display is shaded in the "program name" column of program "b", and "pay" column of program "b" to program "d". That is, as the "program name" column is shaded, it is known as pay program without sample program, and as the "pay" column is shaded, it is known as the pay program that cannot be displayed.

At step SE7, judging if pay broadcast reception mode or not, if not in this mode, this program select screen create process is over. In the case of pay broadcast reception mode, however, advancing from step SE7 to step SE8, "1" is set in NR, and the shading of the "pay" column of the value of KBR indicated by this NR is erased (step SE9). Herein, the permit program number data write region 4b comprises, as mentioned above, permit program number registers KBR1 to KBR4, and a program number (any one of "2" to "4" in this embodiment) decided to pay and view by the following procedure is stored in KBR1 to KBR3. The program number decided to pay and view is stored sequentially from KBR1, and always "0" is stored in KBR4.

At step SE8, first, NR=1 is set, and at next step SE9, the shading of the "pay" column of the program number corresponding to the value of KBR1 is erased, so that it shows that the program of this program number is selected as pay view. Then, judging if the sample program presence or absence code of the program of the value of KBR1 is MB=1 or not (step SE10), and in the case of MB=1 and presence of sample program, the "sample program" column corresponding to this program is shown in shaded (step SE11). As a result, since this program is selected as pay view, it shows view of sample program is unnecessary. In the case of MB=0 and absence of sample program at step SE10, the shading of the "program name" column corresponding to this program is erased (step SE12). Following step SE11 or step SE12, after increasing the NR (step SE13), it is judged if the value of the KBR indicated by this increased NR is "0" or not (step SE14), and if not "0", the procedure returns to step SE9, and if "0", this program select screen create process is over.

Therefore, when the program numbers are stored in all of KBR1 to KBR3, the loop of step SE9 to step SE14 is repeated three times, and when NR=4, since KBR4 is always "0", the sequence advances from step SE14 to stop process.

For example, when BM2=program "b" and BM4=program "d" (sample program is present in this BM4=program "d") are selected preliminarily, the loop is repeated twice, and the shading remains in the "pay" column of 3:program "C" as shown in FIG. 23, and also shading is added to the "sample program" column of 4:program "d". That is, the shading of the "pay" column indicates it is a pay program that is not selected, and the shading of the "sample program" column means this pay program is selected, and the sample program cannot be viewed.

Figure 20:
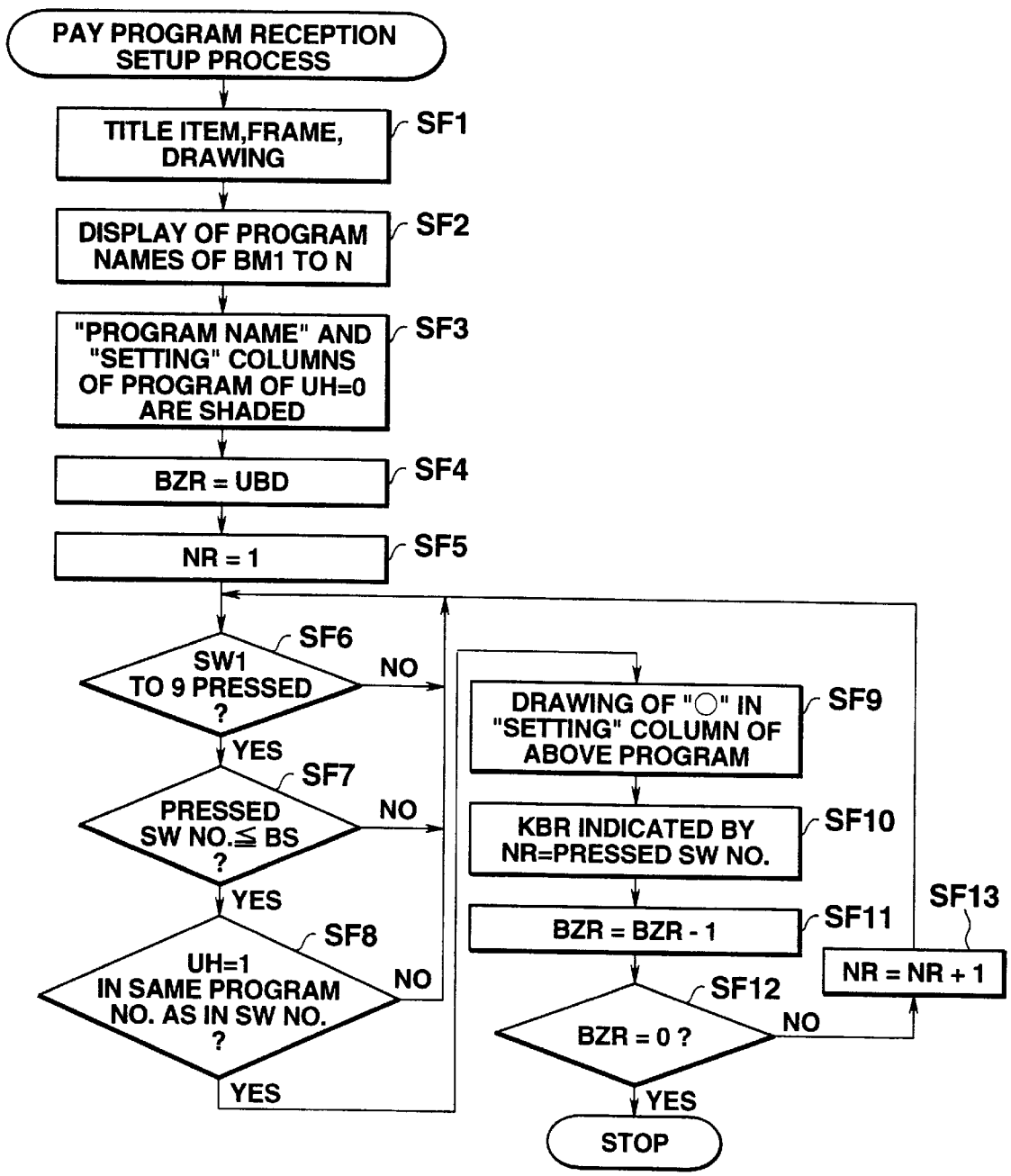
FIG. 20 is a flowchart showing a pay program reception setup process.

On the other hand, the pay program reception setup process (step SA41 in FIG. 13 and step SA56 in FIG. 15) is executed according to the flowchart shown in FIG. 20, and after drawing the title items and frame (step SF1), the program names of BM1 to BMN are displayed (step SF2), and further the "program name" and "setup" columns of pay broadcast code UH=0 (free) are shaded (step SF3). By this procedure at step SF1 to step SF3, as shown in FIG. 24, the display unit 6 shows the title items and frame of "program name" and "setup," and program name a to program name "d" are displayed in the "program name" column, and the program "a" which is a free program is shaded. Hence, program "b" to program "d" which are pay programs to be selected are not shaded and are clarified.

Consequently, in the program permit operation register BZR, the value of pay program permit count data UBD (any one of 1 to 3) stored in the pay program permit count data memory region 52e is stored (step SF4), and initial value "1" is set in NR (step SF5), and it is judged if any one of SW1 to SW9 is pressed (step SF6). Herein, SW1 to SW9 are keys corresponding to "1" it to "9" in the alphanumeric input key group 11 when the alphanumeric select key 9 is in the numeric selection state. When any one of SW1 to SW9 is pressed, the pressed SW number is judged to be smaller than the program total number BS (BS=4 in this embodiment as mentioned above) or not (step SF7), and if not smaller than BS, the procedure returns to step SF6. If smaller than BS, it is judged if the pay broadcast code of the same program number as the SW number is "1" or not (step SF8).

Herein, in the case of UH=0 and free program, the procedure returns to step SF6, and in the case of UH=1 and pay program, a circle is put in the "setup" column of the program in this program or the same program number as the SW number (step SF9). Moreover, the pressed SW number is stored in the KBR indicated by NR (step SF10), and after decreasing the BZR (step SF11), it is judged if BZR=0 or not (step SF12). If BZR≠0, increasing the NR by one (step SF13) and returning to step SF6, and the loop of step SF6 to step SF13 is repeated until becoming BZR=0, and the moment reaching BZR=0, this pay program reception setup process is over. Therefore, for example, if the pay program permit count data UBD is "2", when SW2 and SW4 are pressed sequentially, a circle is shown in the "setup" column of program "b" and program "d" as shown in FIG. 24 by the process at step SF9, and procedure at step SF10 leads to KBR1=1, KBR2=2, while remaining at KBR3=0, KBR4=0, and thereby becoming BZR=2−1−1=0, this pay program reception setup process is over.

At this time, as shown in the drawing, the value of "number of programs that can be set" is displayed, and this value of "number of programs that can be set" varies from "2" to "1" to "0" in this example, and the number of programs that can be set is sequentially shown while decreasing the value. By visually recognizing it, the setup operation can be done while recognizing the number of programs that can be set.

Figure 21:
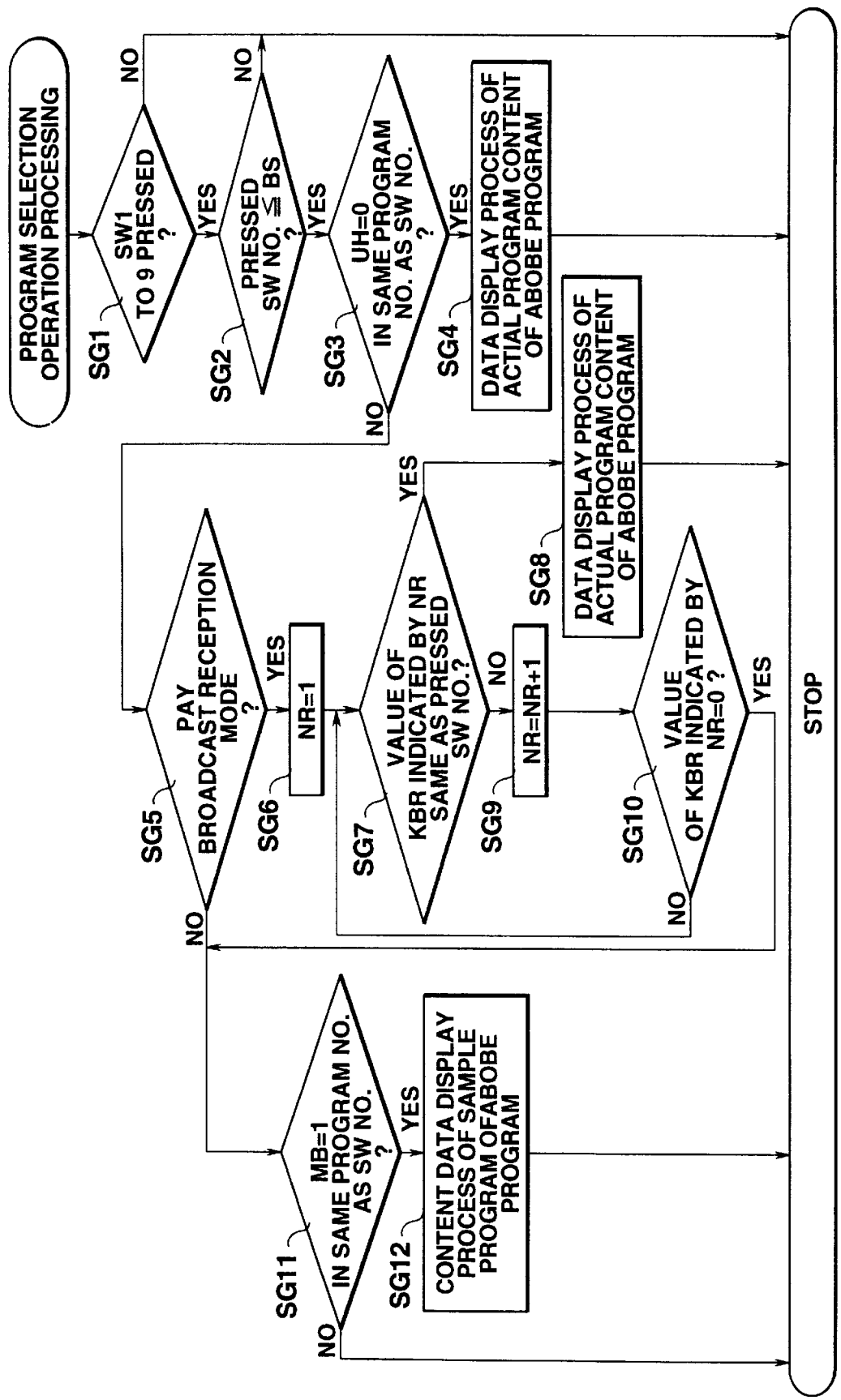
FIG. 21 is a flowchart showing a program selection operation process.

On the other hand, the program select operation process (step SD5) is executed according to the flowchart shown in FIG. 21. That is, judging if any one of SW1 to SW9 is pressed or not (step SG1), if any one of SW1 to SW9 has been pressed, the pressed SW number is judged to be smaller than the total number of programs BS or not (step SG2). If smaller than BS, the pay broadcast code UH of the same program number as the SW number is judged to be "0" or not (step SG3), and in if UH=0 and free, immediately, the program content data of this program is displayed (step SG4). By the procedure of step SG4, the program content of the free program (program "a" in this example) stored in the reception data memory 47 is read out, and shown in the display unit 6.

As a result of judgment at step SG3, in the case of UH=1 and pay program, it is judged if the mode is pay broadcast reception mode or not (step SG5), and in the case of pay broadcast reception mode, "1" is set in NR (step SG6). Next, the value of the KBR indicated by NR is judged if same as the pressed SW or not (step SG7), and if same, the program content data of this program is displayed (step SG8). If not same, after increasing the NR (step SG9), the value of KBR indicated by NR is judged to be "0" or not (step SG10), and if not "0", the procedure returns to step SG7, and if "0", the procedure advances to step SG10.

That is, when the same SW number as the switch selected and operated in the pay program reception setup process previously shown in FIG. 20, at step SG7, the value of the KBR indicated by NR is always same as the pressed SW number. That is, in the example in the pay program reception setup process in FIG. 20, SW2 and SW4 are pressed sequentially, and procedure at step SF10 leads to KBR1=2, KBR2=4, and KBR3=0 and KBR4=0 are set. Therefore, during this program select operation process, when SW2 is operated, at the moment of NR=1, the KBR1 indicated by NR=1 is 2, and the SW2 number and KBR1 value "2" are same at step SG7. Hence, at step SG8, the program content of program "b" of program number 2 is shown in the display unit 6.

During this program select operation process, when SW4 is manipulated, at the moment of NR=2, the KBR2 indicated by NR=2 is 4, and hence the SW4 number and KBR2 value "4" are same at step SG7. Hence, at step SG8, the program content of program "d" of program number 4 is shown in the display unit 6. Therefore, during program select operation process, by manipulating the same SW number as in the pay program reception setup process, the content of the pay program preliminarily decided to view can be observed.

In this example, since KBR3=0, KBR4=0 are set as described above, at the moment of NR=3, NR=3 indicates KBR3=0, and thereby the procedure advances from step SG10 to step SG11. However, if a certain program number is also stored in KBR3, since always "0" is stored in KBR4, from the moment of NR=4, the procedure advances from step SG10 to step SG11.

In the case of KBR value="0" indicated by NR, and when a different SW number is pressed from the time of pay program reception setup process, or in the case of free broadcast reception mode, at step SG11 following step SG5 and step SG10, judging if the sample program presence or absence code MB=1 in the same program number as the SW number or not (step SG11), in the case of MB=0 and absence of sample program, this program select operation process is terminated, and in the case of MB=1 and presence of sample program, the sample program content data of this program is displayed (step SG12).

Therefore, by manipulating a different SW number from the time of pay program reception setup process, if there is a sample program in other pay program that has not been selected, it can be viewed freely, and if the valid term transferred from the IC card 2 to the apparatus main body has been terminated, by manipulating a SW number within the total number of programs BS, a sample program, if any, can be freely viewed.

In this embodiment, it is judged if the term information transferred from the IC card is terminated or not by the received date data, but, for example, a clock circuit may be incorporated at the receiving apparatus side, and the clock data in the clock circuit may be calibrated by the reception data, so that expiration or not may be judged by the clock data in this clock circuit.

Also in the embodiment, the valid term for viewing the pay program can be transferred in divided portions or in plural times, but, instead, the number of times for viewing pay programs or the quantity of valid information may be designed to be transferred in divided portions or in plural times.

Moreover, in the embodiment, the valid term for one time stored in the IC card 2 is divided into two portions and transferred, but it may be also transferred by dividing in three or more multiple portions. In the embodiment, the IC card is shown as the storing medium, but not limited to this, other media may be used, for example, IC chip of coin shape, IC chip of postage stamp shape, and bar code printed card.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the present invention is applied widely, not only in FM multiplex broadcasting system, but also in paging system utilizing radio communication, wired and radio communication, and broadcasting.

What is claimed is:

1. A display information receiving apparatus comprising:
    a receiver for receiving display information transmitted from a display information transmitting station;
    a display for displaying the display information received by said receiver;
    a connector to which a storing medium for storing condition information may be detachably connected, said condition information indicating a condition for permitting said display to display said display information;
    a memory into which the condition information is written from said storing medium when said storing medium is connected to said connector;
    display control means for permitting/prohibiting display of the display information by said display based on the condition information stored in said memory; and
    memory control means for prohibiting writing of the condition information into said memory during a period of time when the display of the display information is permitted by said display control means.

2. A display information receiving apparatus according to claim 1, wherein the display information is multiplexed on FM radio broadcast waves and transmitted therewith, and said receiver comprises an FM radio broadcast wave receiver and a decoder for decoding said multiplexed display information.

3. A display information receiving apparatus according to claim 1, wherein said condition information comprises time limit information showing a permissible time limit of display of the display information by said display.

4. A display information receiving apparatus according to claim 1, further comprising informing means for informing a user of an occurrence of a prohibition of receipt and storage of the condition information by said memory from said storing medium.

5. A display information receiving apparatus according to claim 1, further comprising:

instructing means for instructing the condition information stored in said storing medium to be written into said memory, said memory receiving and storing the condition information from said storing medium responsive to an instruction from said instructing means; and an informing means for informing a user that the condition information is being written into said memory when said instructing means instructs the condition information stored in said storing medium to be written into said memory.

6. A display information receiving apparatus comprising:

a receiver for receiving display information transmitted from a display information transmitting station;

a display for displaying the display information received by said receiver;

a connector to which a storing medium for storing condition information may be detachably connected, said condition information indicating a condition for permitting said display to display said display information;

dividing means for dividing the condition information;

a memory for storing the condition information divided by said dividing means; and display control means for permitting/prohibiting display of the display information by said display based on the condition information stored in said memory.

7. A display information receiving apparatus according to claim 6, wherein the display information is multiplexed on FM radio broadcast waves and transmitted therewith, and said receiver comprises an FM radio broadcast wave receiver and a decoder for decoding said multiplexed display information.

8. A display information receiving apparatus according to claim 6, wherein the condition information comprises time limit information showing a permissible time limit of display of the display information by said display.

9. A display information receiving apparatus comprising:

a receiver for receiving display information transmitted from a display information transmitting station;

a display for displaying the display information received by said receiver;

a memory for storing information;

a connector to which a storing medium for storing condition information and count information may be detachably connected, said condition information indicating a condition for permitting said display to display said display information, and said count information indicating a remaining number of times said condition information is able to be transferred to at least one of said memory and another memory of another display information receiving apparatus;

memory control means for controlling a writing operation for writing said condition information from said storing medium into said memory, said writing operation being permitted to be performed the number of times indicated by the count information stored in the storing medium; and display control means for permitting/prohibiting display of the display information by said display based on the condition information stored in said memory.

10. A display information receiving apparatus according to claim 9, wherein the display information is multiplexed on FM radio broadcast waves and transmitted therewith, and said receiver comprises an FM radio broadcast wave receiver and a decoder for decoding said multiplexed display information.

11. A display information receiving apparatus according to claim 9, wherein the condition information comprises time limit information showing a permissible time limit of display of the display information by said display.

12. A display information receiving apparatus comprising:

a receiver for receiving display information transmitted from a display information transmitting station;

a display for displaying the display information received by said receiver;

a connector to which a storing medium for storing condition information and limit information may be detachably connected, said condition information indicating a condition for permitting said display to display said display information, and said limit information indicating an expiration date of the storing medium;

a memory for storing information;

memory control means for controlling a writing operation for writing said condition information from said storing medium into said memory, said writing operation being permitted up until the expiration date indicated by the limit information stored in the storing medium; and display control means for permitting/prohibiting display of the display information by said display means based on the condition information stored in said memory.

13. A display information receiving apparatus according to claim 12, wherein the display information is multiplexed on FM radio broadcast waves and transmitted therewith, and said receiver comprises an FM radio broadcast wave receiver and a decoder for decoding said multiplexed display information.

14. A display information receiving apparatus according to claim 12, wherein said condition information comprises time limit information showing a permissible time limit of display of the display information by said display.

15. A storing medium detachably installable in a display information receiving apparatus for receiving display information transmitted from a display information transmitting station, said storing medium comprising:

a storage device for storing condition information indicating a condition for permitting display of the display information received by said display information receiving apparatus, and for storing count information indicating a remaining number of times said condition information is able to be transferred to at least one of a memory provided in said display information receiving apparatus and another memory provided in another display information receiving apparatus; and an interface for interfacing with said display information receiving apparatus.

16. A storing medium detachably installable in a display information receiving apparatus for receiving display information transmitted from a display information transmitting station, said storing medium comprising:

a storage device for storing condition information indicating a condition for permitting display of the display information received by said display information receiving apparatus, and for storing limit information indicating an expiration date of the storing medium up until which a writing operation for writing said condition information into a memory provided in said display information receiving apparatus is permitted; and an interface for interfacing with said display information receiving apparatus.

* * * * *